United States Patent
Naya

(10) Patent No.: US 9,013,748 B2
(45) Date of Patent: Apr. 21, 2015

(54) ROTATABLE INPUT DISPLAY DEVICE, METHOD OF CONTROLLING THE SAME, STORAGE MEDIUM, AND PRINTING APPARATUS

(71) Applicant: Canon Kabushiki Kaisha, Tokyo (JP)

(72) Inventor: Yuji Naya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 13/899,997

(22) Filed: May 22, 2013

(65) Prior Publication Data
US 2013/0329249 A1 Dec. 12, 2013

(30) Foreign Application Priority Data
Jun. 12, 2012 (JP) ................................. 2012-133275

(51) Int. Cl.
| | |
|---|---|
| G06K 15/00 | (2006.01) |
| G06F 3/01 | (2006.01) |
| H04N 1/00 | (2006.01) |
| G06F 3/12 | (2006.01) |

(52) U.S. Cl.
CPC ............ *G06K 15/005* (2013.01); *G06F 3/1204* (2013.01); *G06F 3/1205* (2013.01); *G06F 3/125* (2013.01); *G06F 3/1256* (2013.01); *G06F 3/1258* (2013.01); *G06F 3/1271* (2013.01); *G06F 3/01* (2013.01); *H04N 1/00411* (2013.01); *H04N 1/00448* (2013.01); *H04N 1/00493* (2013.01); *H04N 1/00503* (2013.01)

(58) Field of Classification Search
CPC ........... H04N 1/00503; H04N 1/00493; G06F 3/1271; G06F 3/1258
USPC ................................. 358/1.13–1.15; 345/649
See application file for complete search history.

(56) References Cited

U.S. PATENT DOCUMENTS

| | | | |
|---|---|---|---|
| 6,520,013 B1 | 2/2003 | Wehrenberg | |
| 2007/0058210 A1* | 3/2007 | Sakuramata et al. | 358/448 |
| 2008/0218816 A1 | 9/2008 | Sakuramata et al. | |
| 2009/0015597 A1* | 1/2009 | Nicolas et al. | 345/649 |
| 2011/0018904 A1* | 1/2011 | Tang | 345/656 |
| 2011/0317195 A1* | 12/2011 | Mitsui et al. | 358/1.13 |
| 2012/0105893 A1* | 5/2012 | Ito | 358/1.13 |
| 2012/0131452 A1* | 5/2012 | Ogino et al. | 715/274 |
| 2012/0229375 A1* | 9/2012 | Tani | 345/156 |
| 2013/0169981 A1* | 7/2013 | Takahashi | 358/1.9 |
| 2013/0182014 A1* | 7/2013 | Park | 345/649 |

FOREIGN PATENT DOCUMENTS

| | | |
|---|---|---|
| JP | 2008-227584 A | 9/2008 |
| JP | 2011-54177 A | 3/2011 |

* cited by examiner

*Primary Examiner* — Dov Popovici
(74) *Attorney, Agent, or Firm* — Fitzpatrick, Cella, Harper & Scinto

(57) ABSTRACT

An input display device, a method of controlling the same, a program, and a printing apparatus that enable an intuitive change in page layout order without reducing the display area of a preview screen in a preview display of an image to be printed are provided. To accomplish this, when pages of held original data are aggregated and displayed at one time as a preview of multiple pages, if a predetermined rotation operation has been detected, the input display device changes the layout order of the displayed pages according to a combination of the orientation of the input display device and the predetermined rotation operation, and reflects the changed page layout order on the held original data.

10 Claims, 21 Drawing Sheets

FIG. 6

| NAME OF COMBINED OPERATION | PANEL ORIENTATION | COMBINED BASIC ROTATION OPERATIONS |
|---|---|---|
| RIGHT TWIST RETURN | PORTRAIT ORIENTATION | a: □ →45-DEGREE RIGHT TWIST→ ◊ →45-DEGREE LEFT TWIST→ □ |
| RIGHT TWIST RETURN | LANDSCAPE ORIENTATION | a': □ →45-DEGREE RIGHT TWIST→ ◊ →45-DEGREE LEFT TWIST→ □ |
| LEFT TWIST RETURN | PORTRAIT ORIENTATION | b: □ →45-DEGREE LEFT TWIST→ ◊ →45-DEGREE RIGHT TWIST→ □ |
| LEFT TWIST RETURN | LANDSCAPE ORIENTATION | b': □ →45-DEGREE LEFT TWIST→ ◊ →45-DEGREE RIGHT TWIST→ □ |
| FRONT ROTATION RETURN | PORTRAIT ORIENTATION | c: □ →45-DEGREE FRONT ROTATION→ ◊ →45-DEGREE BACK ROTATION→ □ |
| FRONT ROTATION RETURN | LANDSCAPE ORIENTATION | c': □ →45-DEGREE FRONT ROTATION→ ◊ →45-DEGREE BACK ROTATION→ □ |
| BACK ROTATION RETURN | PORTRAIT ORIENTATION | d: □ →45-DEGREE BACK ROTATION→ ◊ →45-DEGREE FRONT ROTATION→ □ |
| BACK ROTATION RETURN | LANDSCAPE ORIENTATION | d': □ →45-DEGREE BACK ROTATION→ ◊ →45-DEGREE FRONT ROTATION→ □ |
| RIGHT ROTATION RETURN | PORTRAIT ORIENTATION | e: □ →45-DEGREE RIGHT ROTATION→ ◊ →45-DEGREE LEFT ROTATION→ □ |
| RIGHT ROTATION RETURN | LANDSCAPE ORIENTATION | e': □ →45-DEGREE RIGHT ROTATION→ ◊ →45-DEGREE LEFT ROTATION→ □ |
| LEFT ROTATION RETURN | PORTRAIT ORIENTATION | f: □ →45-DEGREE LEFT ROTATION→ ◊ →45-DEGREE RIGHT ROTATION→ □ |
| LEFT ROTATION RETURN | LANDSCAPE ORIENTATION | f': □ →45-DEGREE LEFT ROTATION→ ◊ →45-DEGREE RIGHT ROTATION→ □ |

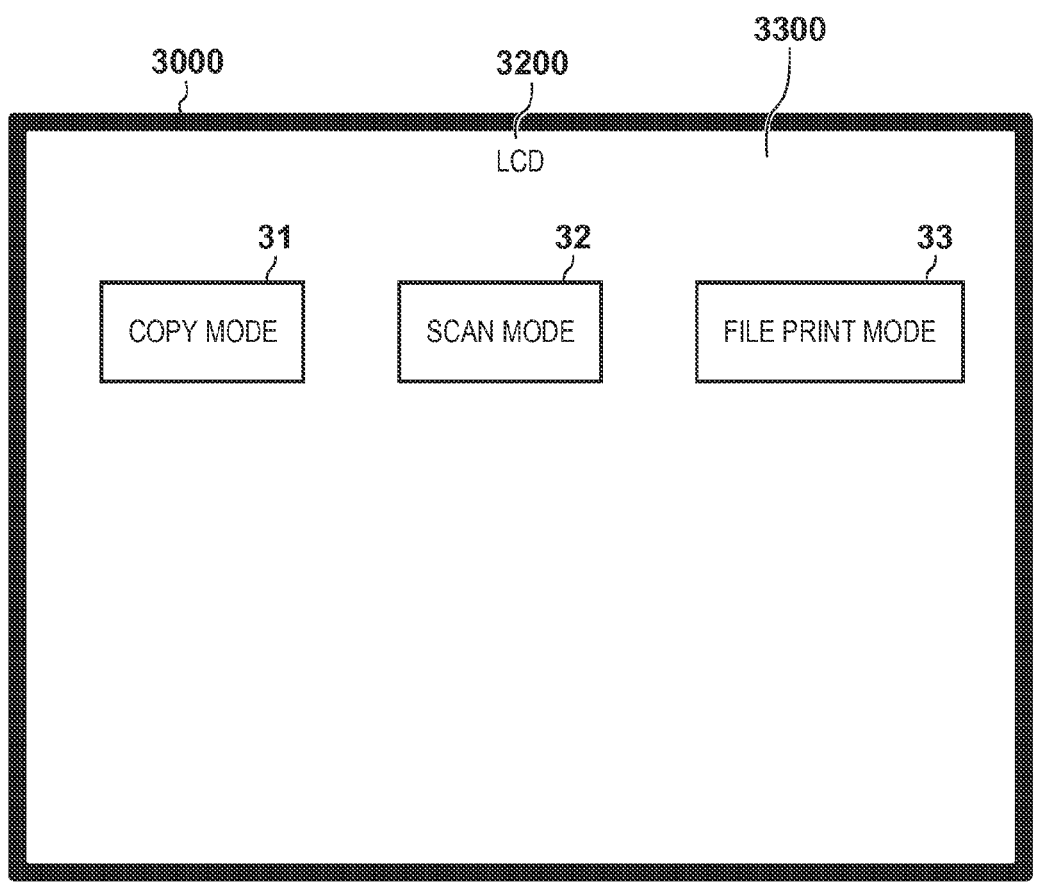

FIG. 8
| PANEL ORIENTATION \ DISPLAY DIRECTION OF ORIGINAL | PORTRAIT | LANDSCAPE |
|---|---|---|
| PORTRAIT ORIENTATION | a 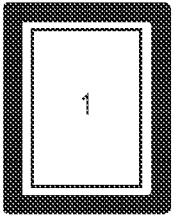 | b 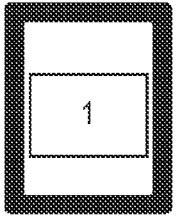 |
| LANDSCAPE ORIENTATION | c 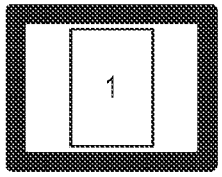 | d 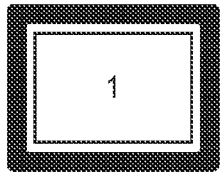 |

FIG. 9

| NAME OF PAGE LAYOUT CHANGE PROCESSING | INITIAL SCREEN | OPERATION PERFORMED BY USER | SCREEN AFTER CHANGE |
|---|---|---|---|
| LEFT-RIGHT PAGE REVERSAL | a 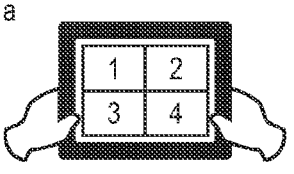 | RIGHT TWIST RETURN ⇨ |  |
| | b 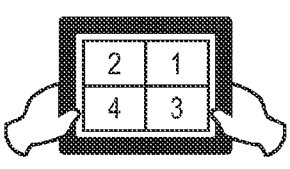 | LEFT TWIST RETURN ⇨ | 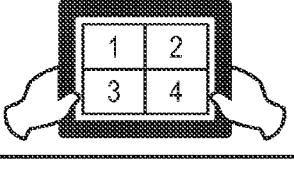 |
| TOP-BOTTOM PAGE REVERSAL | c  | FRONT ROTATION RETURN ⇨ | 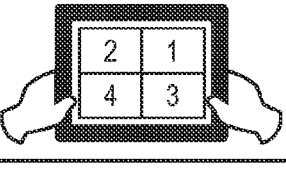 |
| | d 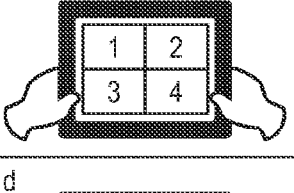 | BACK ROTATION RETURN ⇨ |  |
| ALL-PAGE CLOCKWISE ROTATION | e 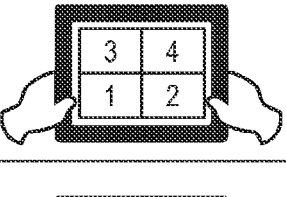 | RIGHT ROTATION RETURN ⇨ | 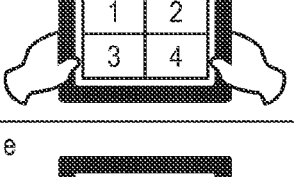 |
| ALL-PAGE COUNTER-CLOCKWISE ROTATION | f  | LEFT ROTATION RETURN ⇨ | 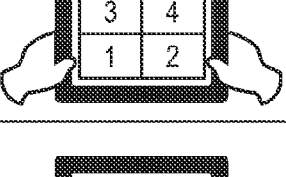 |

※1, 2, 3, AND 4 REPRESENT THE FIRST, SECOND, THIRD, AND FOURTH AGGREGATED PAGES RESPECTIVELY

FIG. 10

| IMPLEMENTED PROCESSING | INITIAL SCREEN | OPERATION PERFORMED BY USER | SCREEN AFTER CHANGE |
|---|---|---|---|
| a | DISPLAY IMAGE ROTATION+DISPLAY SCALE CHANGE (NO CHANGE IN PAGE LAYOUT) | 90-DEGREE LEFT ROTATION | |
| b | DISPLAY IMAGE ROTATION+DISPLAY SCALE CHANGE (NO CHANGE IN PAGE LAYOUT) | 90-DEGREE RIGHT ROTATION | |

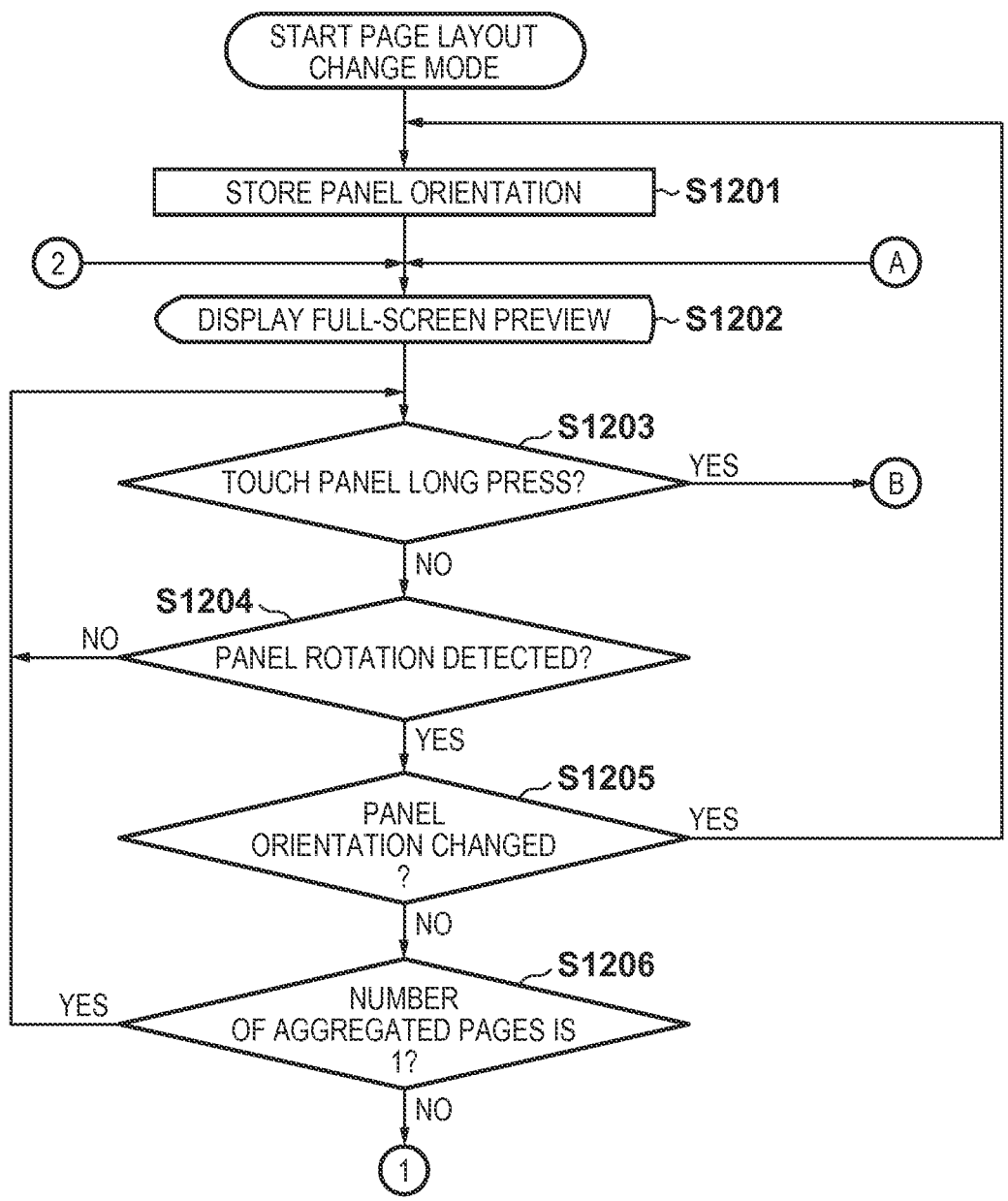

FULL-SCREEN PREVIEW DISPLAY OF A FOUR-PAGE
AGGREGATED ORIGINAL DATA FILE

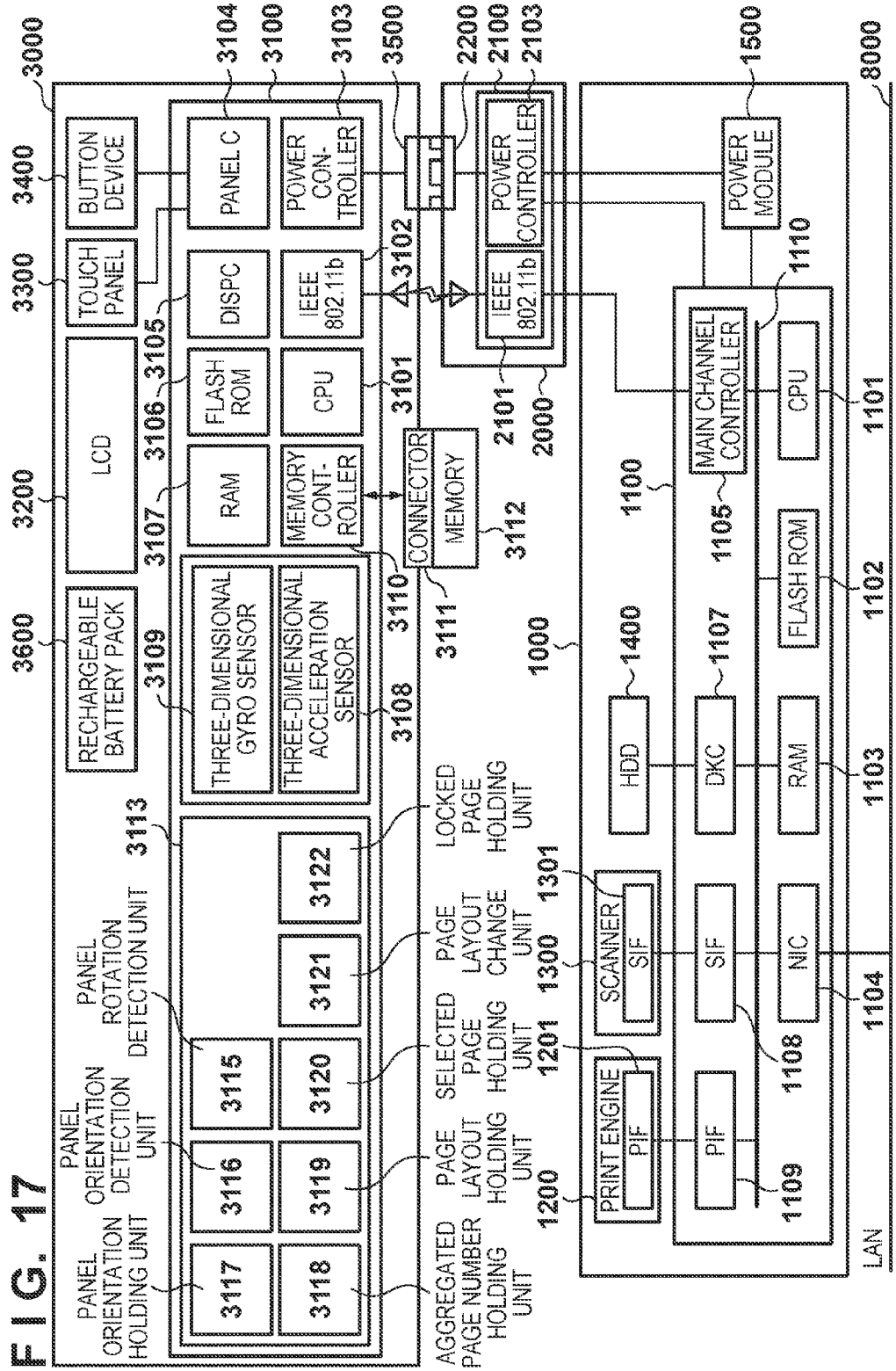

FIG. 18

| NAME OF PAGE LAYOUT CHANGE PROCESSING | | INITIAL SCREEN | OPERATION PERFORMED BY USER | SCREEN AFTER CHANGE |
|---|---|---|---|---|
| LEFT-RIGHT PAGE REVERSAL | a | [1 2 / 3 4] | RIGHT TWIST RETURN ⇒ | [1 2 / 3 4] |
| | b | [1 2 / 3 4] | LEFT TWIST RETURN ⇒ | [1 2 / 3 4] |
| TOP-BOTTOM PAGE REVERSAL | c | [1 2 / 3 4] | FRONT ROTATION RETURN ⇒ | [1 4 / 3 2] |
| | d | [1 2 / 3 4] | BACK ROTATION RETURN ⇒ | [1 4 / 3 2] |
| ALL-PAGE CLOCKWISE ROTATION | e | [1 2 / 3 4] | RIGHT ROTATION RETURN ⇒ | [1 3 / 4 2] |
| ALL-PAGE COUNTER-CLOCKWISE ROTATION | f | [1 2 / 3 4] | LEFT ROTATION RETURN ⇒ | [1 4 / 2 3] |

※ 1, 2, 3, AND 4 REPRESENT THE FIRST, SECOND, THIRD, AND FOURTH AGGREGATED PAGES RESPECTIVELY

ROTATABLE INPUT DISPLAY DEVICE, METHOD OF CONTROLLING THE SAME, STORAGE MEDIUM, AND PRINTING APPARATUS

BACKGROUND OF THE INVENTION

1. Field of the Invention

The present invention relates to an input display device with a sensor that can detect a rotation operation, a control method, a storage medium, and a printing apparatus.

2. Description of the Related Art

Current printing apparatuses including input display panels that are integrated with the main body are widespread, but input display panels that are detachable from the main body are also known. Japanese Patent Laid-Open No. 2008-227584 provides an input display panel with which printing settings can be set using a thumbnail display and preview display of a print image. Japanese Patent Laid-Open No. 2011-54177 provides, in a small computer including a three-dimensional gyro sensor and the like, a function that switches a screen display to a vertical or a horizontal direction upon recognizing the orientation of the device.

However, the conventional techniques described above have the problems described below. Conventionally, operations for changing the page layout order when pages are aggregated in printing settings have not been intuitive. For example, it has been necessary to go through several steps of selection in print settings menus before a preview is displayed, and operations up to seeing a preview have been cumbersome to the user.

Additionally, in the preview display, even with a touch-panel input display panel, screen space has been needed to display icons (buttons), and therefore the display area for a preview screen has been small. For example, when displaying a preview screen, there have been cases where the preview display of the print image is relatively small in order to display icons for designating the sheet size, icons for designating the number of print sets, and the like.

SUMMARY OF THE INVENTION

The present invention enables realization of an input display device that enables intuitive change of page layout order without reducing the display area of a preview screen in a preview display of a print image, a method of controlling the same, a program, and a printing apparatus.

One aspect of the present invention provides an input display device comprising: a holding unit configured to hold print target data; a display unit configured to aggregate pages of the print target data held by the holding unit and display a plurality of pages at one time as a preview; a rotation detection unit configured to detect a rotation operation performed on the input display device by a user; and a change unit configured to, when the plurality of pages are aggregated and displayed by the display unit, if a predetermined rotation operation has been detected by the rotation detection unit, change a layout order of the plurality of pages displayed by the display unit.

Another aspect of the present invention provides a method of controlling an input display device, comprising: aggregating pages of print target data and displaying a plurality of pages at one time as a preview; detecting a rotation operation performed on the input display device by a user; and changing, when the plurality of pages are aggregated and displayed in the display step, if a predetermined rotation operation has been detected in the detection step, a layout order of the plurality of pages displayed in the display step.

Still another aspect of the present invention provides a printing apparatus comprising: an input display device; and a printing unit configured to execute printing according to data received from the input display device, wherein the input display device comprises: a holding unit configured to hold print target data; a display unit configured to aggregate pages of the print target data held by the holding unit and display a plurality of pages at one time as a preview; a rotation detection unit configured to detect a rotation operation performed on the input display device by a user; and a change unit configured to, when the plurality of pages are aggregated and displayed by the display unit, if a predetermined rotation operation has been detected by the rotation detection unit, change a layout order of the plurality of pages displayed by the display unit.

Further features of the present invention will be apparent from the following description of exemplary embodiments with reference to the attached drawings.

BRIEF DESCRIPTION OF THE DRAWINGS

FIG. 6 is a diagram showing an operation when basic rotation operations of the input display panel are combined according to the first embodiment.

FIG. 7 is a diagram showing an example of a basic menu screen of the input display panel according to the first embodiment.

FIG. 8 is a diagram showing an example of a full-screen preview display of page one of an original according to the first embodiment.

FIG. 9 is a diagram showing examples of patterns of processing to change page layout order, and corresponding user operations according to the first embodiment.

FIG. 10 is a diagram showing example operations in the case where processing to change page layout order is not performed according to the first embodiment.

FIGS. 12A and 12B are flowcharts of processing to change page layout order according to the first embodiment.

FIG. 17 is a block diagram showing a configuration of a main body, a dock, and an input display panel according to the second embodiment.

FIG. 18 is a diagram showing examples of patterns of processing to change page layout order and corresponding user operations according to the second embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Configuration of Printing System

A first embodiment of the present invention will be described below with reference to FIGS. 1 through 16. First, a configuration of an overall system in the present embodiment will be described with reference to FIG. 1. A printing system of the present embodiment responds to multicolor printing and binding requests by combining various options in which saddle stitch binding, cutting, folding, and the like, can be performed with a so-called print on demand (POD) machine.

Figure 1:
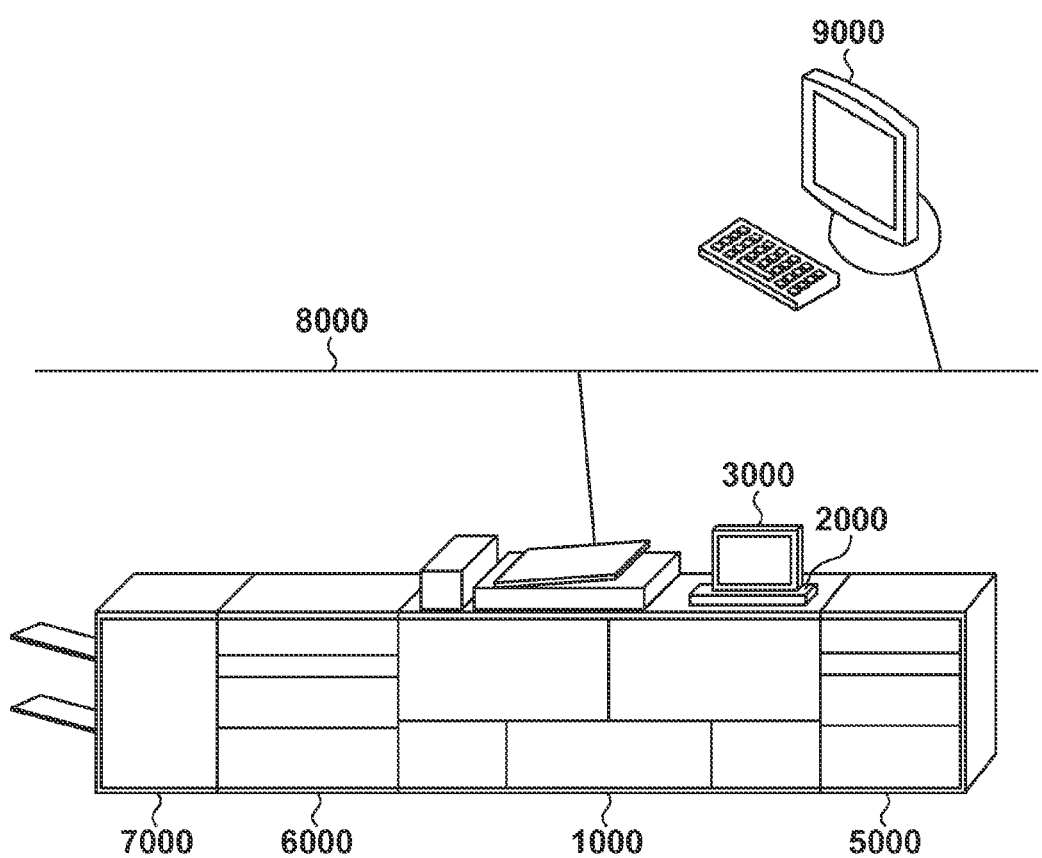
FIG. 1 is a diagram showing an example of a configuration of an image forming system according to a first embodiment.

As shown in FIG. 1, the printing system includes an input display panel (input display device) 3000, a sheet deck 5000, a binder 6000, and a finisher 7000, with respect to a printing apparatus 1000. The printing apparatus 1000 is connected to a personal computer 9000 via a LAN 8000 and is in a configuration in which mutual communication is possible. Generation of a printing job, including settings for binding, cutting, folding, and the like, is performed on the personal computer 9000 by creating and editing each page. The generated printing job is sent to the printing apparatus 1000 via the LAN 8000, and printing output of print data transmitted from the personal computer 9000 can be performed. Additionally, scan input that transmits to the personal computer 9000 a scanned image of a paper original that was read with the printing apparatus 1000 can be performed.

The input display panel 3000 includes a three-dimensional acceleration sensor and a three-dimensional gyro sensor. The input display panel 3000 is a user interface for displaying input that is detachable from the printing apparatus 1000, and is inserted in a dock 2000 mounted on the printing apparatus 1000. The detachable input display panel 3000 can detect an orientation of the input display panel 3000 and a rotation operation due to the inclusion of the three-dimensional acceleration sensor and the three-dimensional gyro sensor. Additionally, the input display panel 3000 is configured to be charged by power supplied from the dock 2000 when inserted in the dock 2000. Note that options of the sheet deck 5000, the binder 6000, the finisher 7000, and the like, are not directly relevant to the present invention, and therefore a detailed explanation of them will be omitted. Additionally, another sensor may be included in place of the three-dimensional acceleration sensor or the three-dimensional gyro sensor as long as it is a sensor that can detect an orientation and a rotation operation of the input display panel 3000.

Control Configuration

Figure 2:
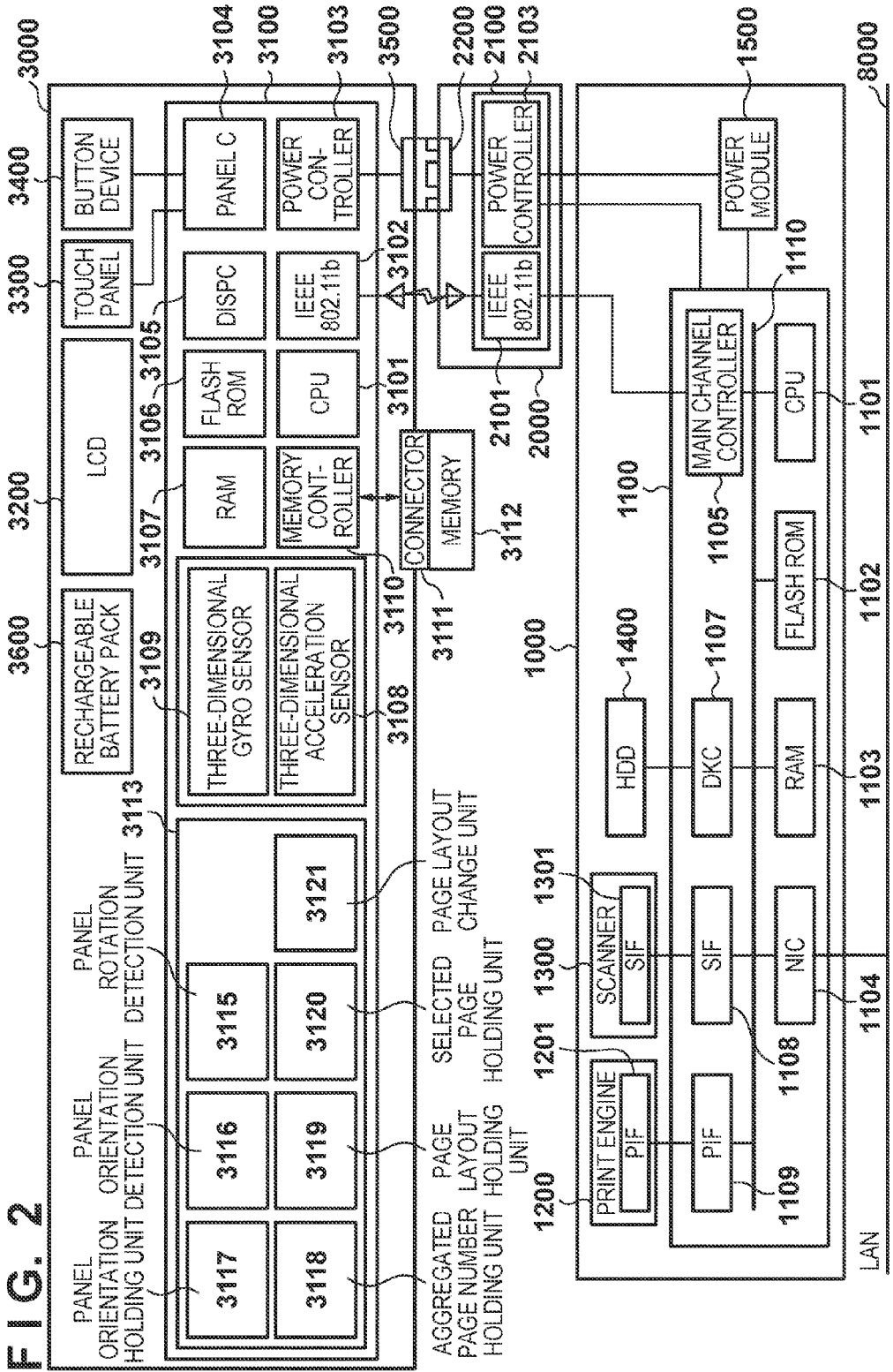
FIG. 2 is a block diagram showing an example of a configuration of a main body, a dock, and an input display panel according to the first embodiment.

Next, a control configuration of the printing apparatus 1000, the dock 2000, and the input display panel 3000 will be described with reference to FIG. 2. As shown in FIG. 2, the printing apparatus 1000 mainly includes a controller board 1100, a print engine 1200, a scanner 1300, a hard disk drive (HDD) 1400, and a power module 1500. Each device operates with electric power supplied by the power module 1500.

The controller board 1100 includes a CPU 1101, a FLASH ROM 1102, a RAM 1103, a network interface card (NIC) 1104, a main channel controller 1105, a disk controller (DKC) 1107, a scanner interface (SIF) 1108, and a printer interface (PIF) 1109. The devices 1101 to 1109 are connected via a bus 1110.

The CPU 1101 is a processor that performs overall control of devices connected to the bus 1110 while executing firmware modules as control programs, which are stored in the FLASH ROM 1102 and the HDD 1400. The RAM 1103 functions as a main memory and a work area for the CPU 1101.

The NIC 1104 bi-directionally performs data exchange with the personal computer 9000 and another printing apparatus via the LAN 8000. The HDD 1400 is accessed via the DKC 1107 and is used not only to store firmware modules, but also as a temporary storage area for images.

The scanner 1300 includes a reading sensor, an original transport mechanism, and the like. The reading sensor, the original transport mechanism (ADF), and the like are controlled based on a firmware module executed with CPU 1101, via an SIF 1108 that is implemented in the controller board 1100 and an SIF 1301 that is implemented the scanner 1300. As a result of this, an original is read by the reading sensor, and the obtained data is sent to the controller board 1100 via the SIF 1301 and the SIF 1108.

The print engine 1200 includes an electrophotographic recording unit, a recording sheet cassette, a sheet transport unit, and the like. Printing requests based on printing jobs are sent from the controller board 1100 via the PIF 1109 and a PIF 1201 implemented in the print engine 1200. The recording unit, the sheet transport unit, and the like are similarly controlled via the PIF 1109 and the PIF 1201, based on the firmware module executed with the CPU 1101. As a result of this, an image corresponding to the printing request is formed on a sheet. The main channel controller 1105 is used when performing an exchange with the printing apparatus 1000 and the detachable input display panel 3000, which is a feature of the present invention.

Dock

The dock 2000 mainly includes a main board 2100 and a connector 2200. The main board 2100 that configures the dock 2000 mainly includes an IEEE 802.11b module 2101 and a power controller 2103. The IEEE 802.11b module 2101 is connected to the main channel controller 1105 of the controller board 1100, and mediates wireless communication with the printing apparatus 1000 and the input display panel 3000 based on a request from the controller board 1100.

The power controller 2103 is connected to the power module 1500 and supplies power to the IEEE 802.11b module 2101 via the power controller 2103. Additionally, the power controller 2103 is also connected to the connector 2200 and when a connector 3500 of the input display panel 3000 is connected to the connector 2200 of the dock 2000, power is supplied to the input display panel 3000. In addition, the power controller 2103 monitors the supply status of electric power, detects whether or not the dock 2000 and the input display panel 3000 are connected, and conveys that information to the control board 1100.

Input Display Panel

As shown in FIG. 2, the detachable input display panel 3000, including a three-dimensional acceleration sensor and a three-dimensional gyro sensor, mainly includes a main board 3100, an LCD 3200, a touch panel 3300, a button device 3400, a connector 3500, and a rechargeable battery pack 3600. The main board 3100 mainly includes a CPU 3101, an IEEE 802.11b module 3102, a power controller 3103, a panel controller (PANELC) 3104, a display controller (DISPC) 3105, a FLASH ROM 3106, a RAM 3107, a three-dimensional acceleration sensor 3108, a three-dimensional gyro sensor 3109, and a memory controller 3110. The devices 3101 to 3110 are connected by a bus (not shown) in a fashion similar to the controller board 1100.

Additionally, a software module cluster 3113 mainly includes a panel rotation detection unit 3115, a panel orientation detection unit 3116, a panel orientation holding unit 3117, an aggregated page number holding unit 3118, a page layout holding unit 3119, a page selection holding unit 3120, and a page layout change unit 3121. The operation of the software module cluster 3113, which is composed of the modules 3114 to 3121, is defined by a control program in the FLASH ROM 3106 on the main board 3100, and processing of the software module cluster 3113 is executed using the CPU 3101 and the RAM 3107. However, the functions of the software module cluster 3113 can be realized even if replaced by a hardware module having the same functions.

The CPU 3101 is a processor that performs overall control of devices connected to the bus, while executing firmware modules as control programs that are stored in the FLASH ROM 3106. The IEEE 802.11b module 3102 establishes wireless communication with the IEEE 802.11b module 2101 in the dock 2000 under control of the CPU 3101, and mediates communication with the printing apparatus 1000.

The power controller 3103 is connected to the connector 3500, and receives a supply of power from the power module 1500 of the printing apparatus 1000 when the connector 2200 of the dock 2000 is in contact. According to this, the rechargeable battery pack 3600, connected to the power controller 3103, is charged, and power is supplied to the entirety of the input display panel 3000. When power is not supplied from the power module 1500, power from the rechargeable battery pack 3600 is supplied to the entirety of the input display panel 3000.

The panel controller (PANELC) 3104 controls the touch panel 3300 and the button device 3400 in response to requests from the CPU 3101. According to this control, a press position on the touch panel 3300, a key code pressed on the button device 3400, and the like are sent to the CPU 3101. In response to a request from the CPU 3101, the display controller (DISPC) 3105 transfers to the LCD 3200 a video image deployed to the RAM 3107 while controlling the LCD 3200. As a result, an image is displayed on the LCD 3200. The FLASH ROM 3106 functions as a storage area of a control program of the CPU 3101. The RAM 3107 functions as a main memory of the CPU 3101, a work area, and an area for video images displayed on the LCD 3200.

The three-dimensional acceleration sensor 3108 has a movable part in a semiconductor chip, and a fin of the movable part moves according to acceleration applied from the outside, thus changing a gap between a fin of an unmovable part and the fin of the movable part, and changing a capacitance. Alternatively, the three-dimensional gyro sensor 3109 is a semiconductor element of a system that uses the Coriolis force. Here, the Coriolis force indicates an inertial force that is received with a size proportionate to moving speed in a direction perpendicular to the direction of movement when moving in a rotating coordinate system. Whether the input display panel 3000 is in the vertical state or the horizontal state, whether it is in the portrait orientation or the landscape orientation, and its three-dimensional movement and position with respect to fore and aft, left and right, and up and down are accurately detected due to signal processing of the output of the three-dimensional acceleration sensor 3108 and the three-dimensional gyro sensor 3109, taking into account the influence of gravity. Note that although other types of such as the piezoresistivity type and the thermosensitivity type are known for the three-dimensional acceleration sensor 3108, any of these known types can be applied in the present invention. Techniques that detect the direction and orientation of a device with use of these varieties of sensors are commonly known, and because all of these techniques are applicable in the input display panel 3000 in the present invention, further detailed description will be omitted.

The memory controller 3110 accesses an external memory 3112, such as an SD memory, via an external memory connector 3111, under control of the CPU 3101. Data can be displayed on the LCD 3200 via the DISPC 3105 by reading out the data inside the external memory 3112. Additionally, data transmission and reception with the printing apparatus 1000 can be performed via the CPU 3101 and the IEEE 802.11b module 3102.

The panel rotation detection unit 3115 detects, based on sensor data from the three-dimensional gyro sensor 3109, how the input display panel 3000 has been rotated. The detected rotation operation will be described later. The panel orientation detection unit 3116 detects whether the input display panel 3000 is in a portrait orientation or a landscape orientation based on sensor data from the three-dimensional acceleration sensor 3108. Specifically, if the direction of the long side of the input display panel 3000 is closer to being parallel with respect to the ground than the short side direction is, it is in the landscape orientation, and if the short side direction is closer to being parallel with respect to the ground than the long side is, it is in the portrait orientation.

A panel orientation holding unit 3117 holds orientation information of the input display panel 3000 detected by the panel orientation detection unit 3116. The aggregated page number holding unit 3118 holds the value of the number of aggregated pages set by the user during print setting. Here, page aggregation refers to a setting for printing multiple print pages on one sheet, and there is a setting for printing two pages on one sheet, a setting for printing four pages on one sheet, and the like. The page layout holding unit 3119 holds the order of the page layout (arrangement) in the page aggregation that the user sets during print setting. The selected page holding unit 3120 holds pages selected by the user as targets of print setting. In response to a rotation operation detected by the panel rotation detection unit 3115, the page layout change unit 3121 performs processing for changing the page layout order of an original undergoing page aggregation.

Wireless Communication

In the present embodiment, wireless communication is performed according to the IEEE 802.11b standard, which is a publicly known technique. In the printing system of the present embodiment, wireless communication is carried out in infrastructure mode, in which the printing apparatus 1000 is an access point (AP), and the input display panel 3000 is a terminal. If there are multiple main bodies within the signal range, the ESSID of the communicable main bodies are displayed on the input display panel 3000, and one of them can be selected. After a communication partner has been established according to an association, the input display panel 3000 of the present embodiment receives data, such as scan data and a job history, from the printing apparatus 1000 and can display that data on the input display panel 3000.

On the other hand, information associated with user operations on the touch panel 3300 or the button device 3400, setting information of printed items, and data files that are stored in the external memory 3112 are transmitted wirelessly from the input display panel 3000 to the printing apparatus 1000 with a protocol that has been set in advance. The transmitted information is, for example, a press position on the touch panel 3300, a key code pressed on the button device 3400, the number of print sets, a data file stored in the external memory 3112, or the like.

The printing apparatus 1000, after receiving information related to operations performed on the touch panel 3300 and the like, controls a printing operation based on the sent information. Additionally, the original data file sent from the input display panel 3000 to the printing apparatus 1000 along with the operation information is deployed to the RAM 1103 of the printing apparatus 1000. Subsequently, the original data file undergoes image processing by the CPU 1101 based on the operation information, and image formation is performed with the print engine 1200 via the PIF 1201. In this way, the printing system of the present embodiment is a system in which the printing apparatus 1000 and the input display panel 3000 can communicate wirelessly with each other.

Panel Control

Panel Rotation Detection Unit

A method of controlling and a method of using the input display panel 3000, to which the present invention is applied, will be described in detail below. First, an operation of the input display panel 3000 that is detected by the panel rotation detection unit 3115 based on sensor data from the three-dimensional gyro sensor 3109 will be described with reference to FIGS. 3 through 6. First, in FIG. 3, the rotation axis of the input display panel 3000 is defined.

Figure 3:
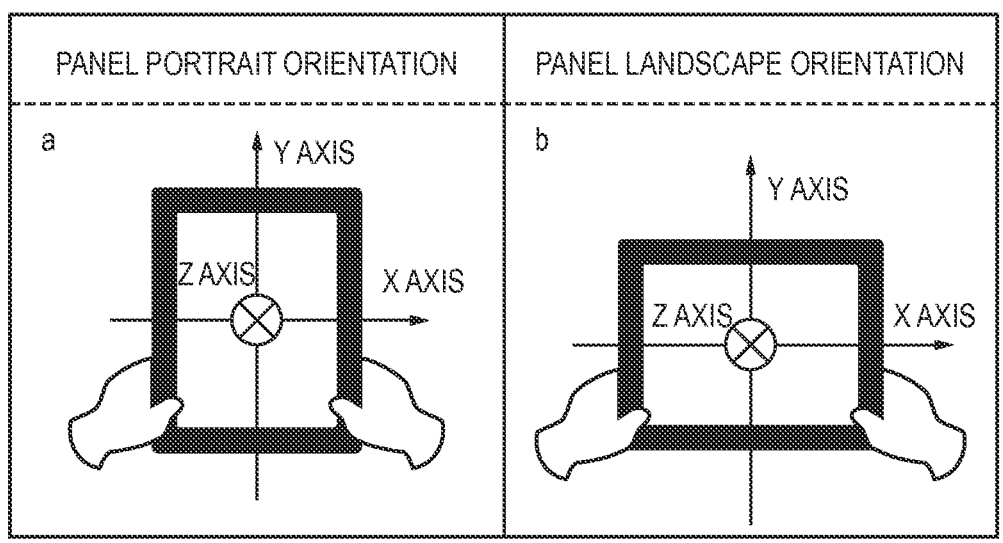
FIG. 3 is a diagram that defines rotation axes for portrait and landscape orientations of the input display panel according to the first embodiment.

FIG. 3-a defines the X, Y, and Z axes, as illustrated, when the input display panel 3000 is in the portrait orientation. FIG. 3-b shows the case in which the input display panel 3000 is in the landscape orientation, and defines the X, Y and Z axes as illustrated. The portrait orientation and the landscape orientation of the input display panel 3000 are determined according to which ends of the input display panel 3000 the user has put in the vertical direction. In the definition of the axes, if the user holds the input display panel 3000 in the portrait orientation, the shorter edge direction is the X axis, the longer edge direction is the Y axis, and the direction from the area in front of the surface of the input display panel 3000 to the area behind it is the Z axis. Additionally, if the user holds the input display panel 3000 in the landscape orientation, the longer edge direction is the X axis, the shorter edge direction is the Y axis, and the direction from the area in front of the surface of the input display panel 3000 to the area behind it is the Z axis.

Figure 4:
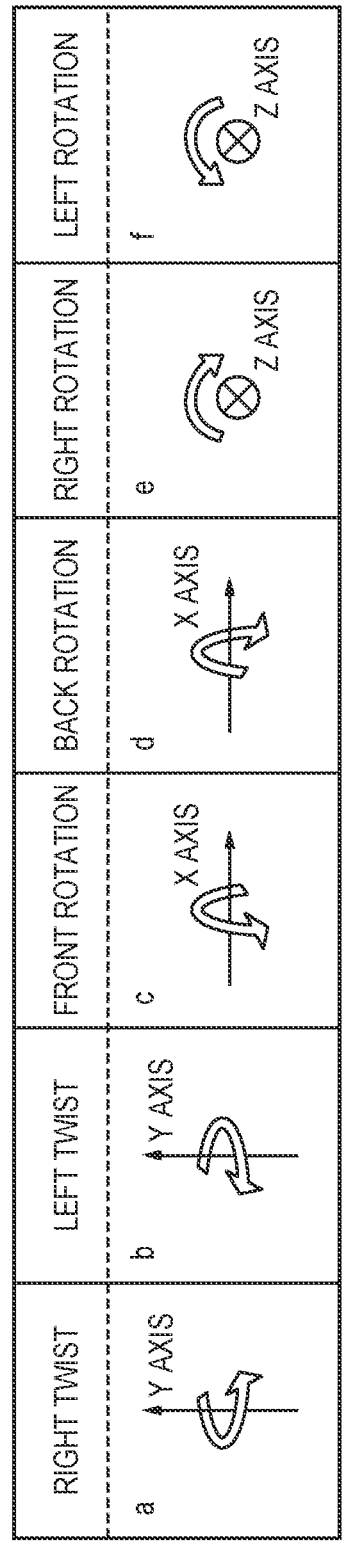
FIG. 4 is a diagram showing a basic rotation operation of the input display panel according to the first embodiment.

Next, basic rotation operations of the input display panel 3000 will be described with reference to FIG. 4. The axes are similar to those defined in FIG. 3. A clockwise rotation with respect to the Y axis is called a "right twist" (FIG. 4-a). A counterclockwise rotation with respect to the Y axis is called a "left twist" (FIG. 4-b). A clockwise rotation with respect to the X axis is called a "front rotation" (FIG. 4-c). A counterclockwise rotation with respect to the X axis is called a "back rotation" (FIG. 4-d). A clockwise rotation with respect to the Z axis is called a "right rotation" (FIG. 4-e). A counterclockwise rotation with respect to the Z axis is called a "left rotation" (FIG. 4-f). In this way, in the present embodiment, various operations can be treated as user input due to defining rotations about the axes. Additionally, according to this, operations that are intuitive to the user can be provided.

Figure 5:
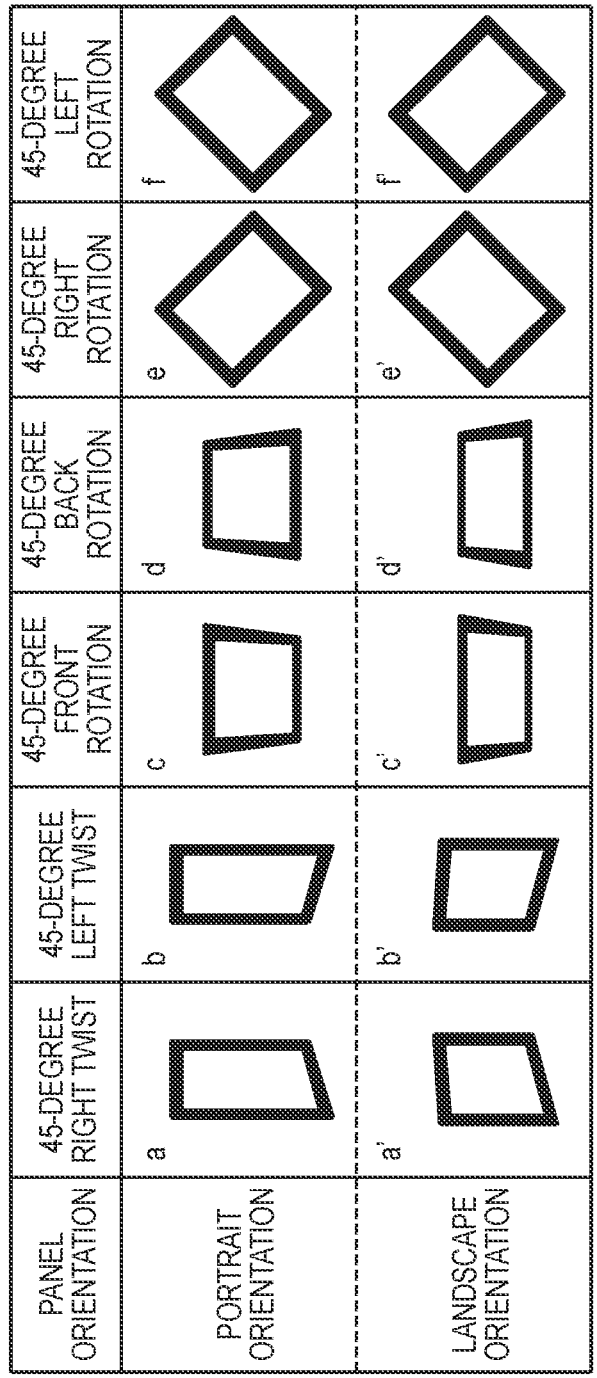
FIG. 5 is a diagram showing an example of the input display panel that has been rotated according to the first embodiment.

FIG. 5 is a diagram illustrating examples in which the basic rotation operations described using FIG. 4 have been applied to the input display panel 3000 when in the portrait orientation and the landscape orientation. FIGS. 5-a, b, c, d, e, and f show the input display panel 3000 in the portrait orientation, and FIGS. 5-a', b', c', d', e', and f' show the input display panel in the landscape orientation.

Additionally, FIGS. 5-a and a' show a 45-degree right twist, b and b' show a 45-degree left twist, c and c' show a 45-degree front rotation, d and d' show a 45-degree back rotation, e and e' show a 45-degree right rotation, and f and f' show a 45-degree left rotation.

FIG. 6 is a diagram showing operations when the basic rotation operations described using FIG. 4 are combined. Additionally, the name of each combined operation is defined. Before describing combined operations, the detection timing and detection angles of rotation angles will be described. First, the base state serving as the reference angle (a state in which the angle of rotation with respect to each axis is zero) is a state in which the panel has been motionless for three seconds before user operation. However, the angle changes moment to moment according to tiny variations in the sensor data from the three-dimensional gyro sensor 3109 and user hand movement. Because of this, if the variation with respect to each axis is less than three degrees in a span of three seconds, that will also be the base state. Note that these constraints are the range of the specifications and are not intended to limit the present invention.

Next, the panel rotation detection unit 3115 detects, using the base state as the reference, how many degrees the input display panel 3000 has rotated with respect to the axes. The timing for detecting a basic rotation operation with respect to the axes is an interval of 0.5 seconds. Additionally, the rotation angle of basic rotation operations is 0 degrees to 180 degrees. For example, the panel rotation detection unit 3115 recognizes a 170-degree right twist as a right twist, but recognizes a 190-degree right twist as a 170-degree left twist. The recognized rotation angle with respect to a left turn, a front rotation, a back rotation, a right rotation, and a left rotation is also 0 degrees to 180 degrees.

Next, a return operation will be described. The CPU 3101 recognizes, based on the rotation angles detected by the panel rotation detection unit 3115, that combined rotation operations have been performed. A return operation with respect to a combined rotation operation, defined with FIG. 6, denotes an operation in which a basic rotation operation is detected at an angle (an angle in a predetermined range) of 45 degrees to 180 degrees from the base state of the input display panel 3000, and then the base state is detected again. However, because it is difficult for a user to return the input display panel 3000 to a perfect base state after a rotation operation, if the base state is returned to within ±10 degrees for example, it is considered as a return to the base state again. For example, if the panel rotation detection unit 3115 detects a 60-degree right twist from the resting state, and subsequently detects a 5-degree left twist, this is not recognized as a right twist return operation. In other words, the last detected 5-degree left twist is considered to be the base state. Additionally, even if the input display panel 3000 detects a 30-degree right twist and subsequently detects a 1-degree left twist, this is not called a right twist operation. This is because the right twist angle is under 45 degrees, and therefore, it is not recognized by the CPU 3101 as a combined rotation operation.

Additionally, in a return operation, the time from when a rotation operation from the base state is detected until the base state is reached again needs to be within three seconds (within a certain time). For example, even if a 50-degree right twist is detected after the base state, if the base state is reached again after four seconds, it is not considered a return operation.

However, the number of seconds and the angle stated above can be freely changed with a program. Additionally, a configuration is possible in which the number of seconds and the angle are changed due to user input when changing them.

On the basis of the above description, combined rotation operations will be described below using FIG. 6. The operation shown in FIGS. 6-a and a' is called a "right twist return", which refers to an operation in which a 45-degree right twist and a 45-degree left twist are combined when the input display panel 3000 is in the portrait orientation and the landscape orientation. The operation shown in FIGS. 6-b and b' is called a "left twist return", which refers to an operation in which a 45-degree left twist and a 45-degree right twist are combined when the input display panel 3000 is in the portrait orientation and the landscape orientation. The operation shown in FIGS. 6-c and c' is called a "front rotation return", which refers to an operation in which a 45-degree front rotation and a 45-degree back rotation are combined when the input display panel 3000 is in the portrait orientation and the landscape orientation. The operation shown in FIGS. 6-d and d' is called a "back rotation return", which refers to an operation in which a 45-degree back rotation and a 45-degree front rotation are combined when the input display panel 3000 is in the portrait orientation and the landscape orientation. The operation shown in FIGS. 6-e and e' is called a "right rotation return", which refers to an operation in which a 45-degree right rotation and a 45-degree left rotation are combined when the input display panel 3000 is in the portrait orientation and the landscape orientation. The operation shown in FIGS. 6-f and f' is called a "left rotation return", which refers to an operation in which a 45-degree left rotation and a 45-degree right rotation are combined when the input display panel 3000 is in the portrait orientation and the landscape orientation.

The angles in the combined operations of FIG. 6 are 45 degrees, but as stated above, even if a 90-degree right twist and a 95-degree left twist are combined for example, it is still considered a "right twist return". The angles defined above are merely one example and the present invention is not limited to this. In the above description, it was stated that if a basic rotation operation is not detected in the range of 45 degrees and 180 degrees, it will not be recognized as a return operation, but these angle settings can be changed freely by a program.

Additionally, a configuration is possible in which the angle settings are changed due to user input when changing them.

Menu Screen

Next, an example screen of the basic menu of the input display panel (operation panel) 3000 of the present embodiment will be described with reference to FIG. 7. Various functions are displayed on the LCD 3200, and by touching the screen, information on the contact position is input to the PANELC 3104 via the touch panel 3300 on the LCD 3200. Subsequently, the CPU 3101 determines, from a comparison of display data and input data, that a function was designated. Reference numeral 31 is a mark (hereafter referred to as an icon) showing a transition to a COPY operation, reference numeral 32 is an icon showing a SCAN operation, and reference numeral 33 is an icon showing file printing. Due to pressing the icons, programs corresponding to the processes are executed. For example, if COPY 31 is selected, the screen (not shown) for performing copy settings for copying by the printing apparatus 1000 is displayed, thus making it possible to perform various settings in accordance with the screen settings and execute copy processing. Additionally, if SCAN 32 is selected, a screen (not shown) for performing scan settings for scanning by the scanner 1300 is displayed, thus making it possible to perform various settings in accordance with the screen settings and execute scan processing.

The following describes a case in which file printing mode 33 is pressed and a data file stored in a storage device is printed. Examples of selectable data files include an original data file stored in the HDD 1400, an original data file in a personal computer connected via the LAN 8000, and the like. In the present embodiment, an original data file, which is stored on the external memory 3112 that is inserted into the memory connector 3111 in the input display panel 3000, is selected. When the external memory 3112, such as an SD card, is inserted into the memory connector 3111 by the user, the external memory 3112 is recognized by the CPU 3101 via the memory controller 3110. A state is entered in which reading and writing of original data files can be performed on the recognized external memory 3112. A preview display of original data files on the external memory 3112 is performed by deploying an original data file as image data to the RAM 3107, and outputting that image data to the LCD 3200 via the DISPC 3105. The flow from the reading of the original data file on the external memory 3112 to printing will be described later.

Additionally, in the present embodiment, a description will be given of the case when in file printing mode 33, but the present invention is not limited to this, and page layout change processing can be performed with use of a similar algorithm in the cases of COPY 31 and SCAN 32 as well. Specifically, in the case of COPY 31, after an original is scanned using the printing apparatus 1000, page layout change processing (a feature of the present invention) and printing can be performed with a print settings screen. In a similar fashion, in the case of SCAN 32, it is sufficient to store an original after performing page layout change processing with a SCAN settings screen. Thus, detailed descriptions of the cases of COPY 31 and SCAN 32 will be omitted since they would be redundant with the description of file print mode 33.

Preview Display

Figure 15:
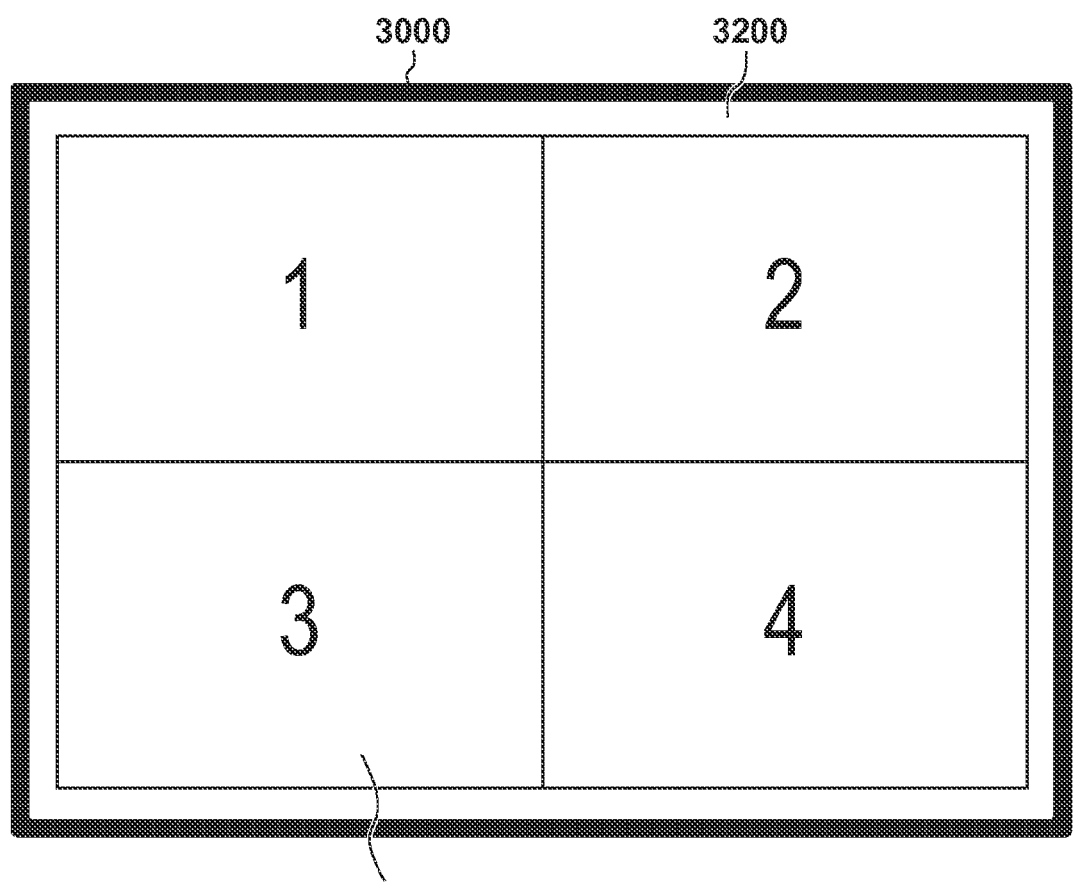
FIG. 15 is a diagram showing an example of a screen in a page layout order change mode according to the first and second embodiments.
Figure 16:
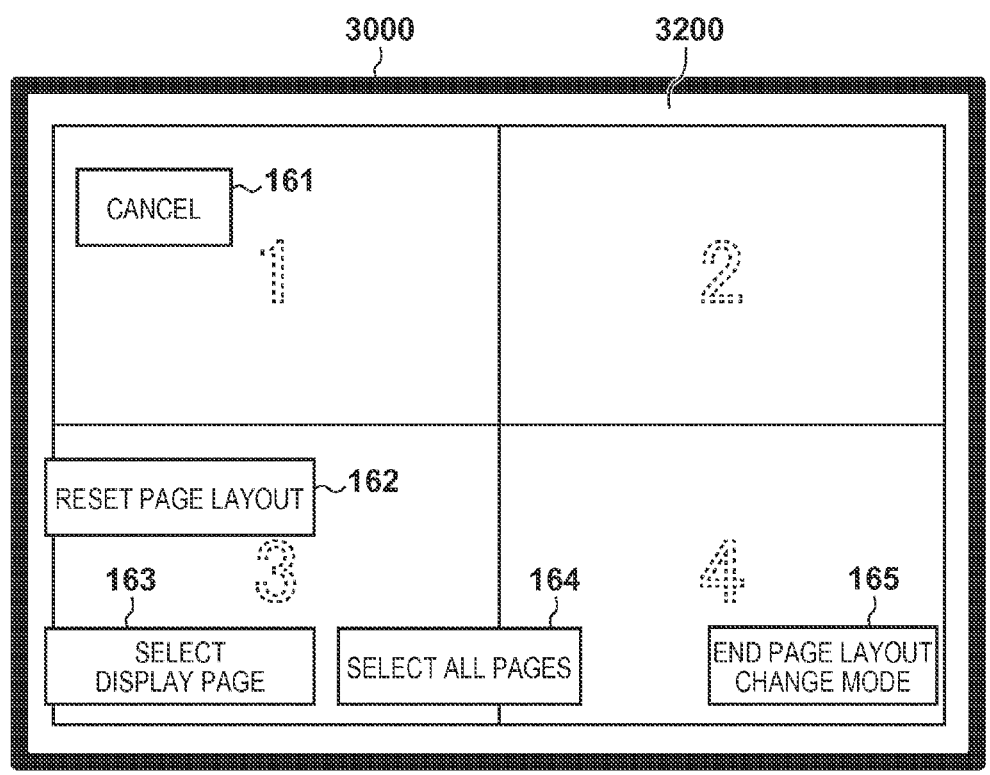
FIG. 16 is a diagram showing an example of a screen for menu selection in the page layout order change mode according to the first and second embodiments.

Next, examples of layouts in page aggregation processing performed on an original that is displayed as a preview will be described with reference to FIGS. 4 through 8. First, examples of layouts in a full-screen preview display of an original (one page) before undergoing page aggregation will be described with reference to FIG. 8. Full-screen preview display means that when a preview of an original data file is displayed, icons and the like are not displayed on the screen of the LCD 3200, and only the preview of the original data file is displayed with the whole screen (with a full screen). For example, FIG. 15 shows a full-screen preview display of an original data file that has had four pages aggregated at one time.

An image of the original data file read from the external memory unit 3112 is displayed as a full-screen preview on the LCD 3200 of the input display panel 3000. In FIG. 8, orientations (portrait orientation, landscape orientation) of the input display panel 3000, and display directions (portrait, landscape) of the original are shown in four combination patterns. The portrait orientation and landscape orientation of the input display panel 3000 are detected by the three-dimensional acceleration sensor 3108. Additionally, the CPU 3101 determines the display direction (portrait, landscape) of the original from attribute information of the original data file. For example, in a JPEG, the number of pixels for height and the number of pixels for width are stored in the header portion, and portrait or landscape display directions can be determined by comparing these numbers. Additionally, the vertical orientation of the original can be determined by reading the EXIF of the JPEG. Note that the JPEG is an example, and the image data format is not limited to this example.

FIGS. 8-*a* and *b* show cases in which the orientation of the input display panel 3000 is the portrait orientation, and if the original data file indicates the portrait direction, it is displayed similarly to FIG. 8-*a*, and if the original data file indicates the landscape direction, it is displayed similarly to FIG. 8-*b*. FIGS. 8-*c* and *d* are cases in which the input panel display 3000 is in the landscape orientation, and if the original data file indicates the portrait direction, it is displayed similarly to FIG. 8-*c*, and if the original data file indicates the landscape direction, it is displayed similarly to FIG. 8-*d*.

Example of Page Layout Change Processing

Next, examples in which a four-page aggregated original displayed as a full-screen preview on the input display panel 3000 undergoes a change of page layout according to a user operation will be described with reference to FIG. 9. FIGS. 9-*a* and *b* show examples in which the page layout order is reversed horizontally due to the user performing a "right twist return" and a "left twist return" on the input display panel 3000. FIGS. 9-*c* and *d* show examples in which the page layout order is reversed vertically due to the user performing a "front rotation return" and a "back rotation return" on the input display panel 3000. FIG. 9-*e* shows an example in which the layout order of all pages is shifted one space clockwise due to the user performing a "right rotation return" on the input display panel 3000. FIG. 9-*f* shows an example in which the layout order of all pages is shifted one space counterclockwise due to the user performing a "left rotation return" on the input display panel 3000. Additionally, even if the input display panel is in the portrait orientation, or if the original display direction is portrait, the page layout order can be changed according to similar user operations.

Example in which Page Layout is not Changed

Next, examples in which the page layout of a four-page aggregated original displayed as a full-screen preview on the input display panel 3000 is not changed by a user operation will be described with reference to FIG. 10. FIGS. 10-*a* and *b* are examples of the case in which the user changes the orientation of the input display panel 3000 from the landscape orientation to the portrait orientation. In a case such as this, the page layout order of the four-page aggregated original on the input display panel 3000 is not changed, but rather, only the orientation of the display and the scale of the original are changed. Additionally, the same follows for the case in which the orientation of the input display panel 3000 is changed from the portrait orientation to the landscape orientation.

However, it is not the case that the display orientation and the scale will be changed immediately after the orientation is changed. As was described with reference to FIG. 6, the input display panel 3000 detects a return operation within three seconds after moving from the base state. In other words, in FIG. 10-*a* the display orientation and scale are not changed within three seconds after the input display panel 3000 is changed from the landscape orientation (base state) to the portrait orientation (90-degree left rotation), but rather, the change occurs after 3 seconds have elapsed. Conversely, if it is changed from the landscape orientation (base state) to the portrait orientation (90-degree left rotation), and is furthermore returned to the landscape orientation (base state) within three seconds, it will be considered a left rotation return operation.

Flow of Printing of an Original Data File

Figure 11:
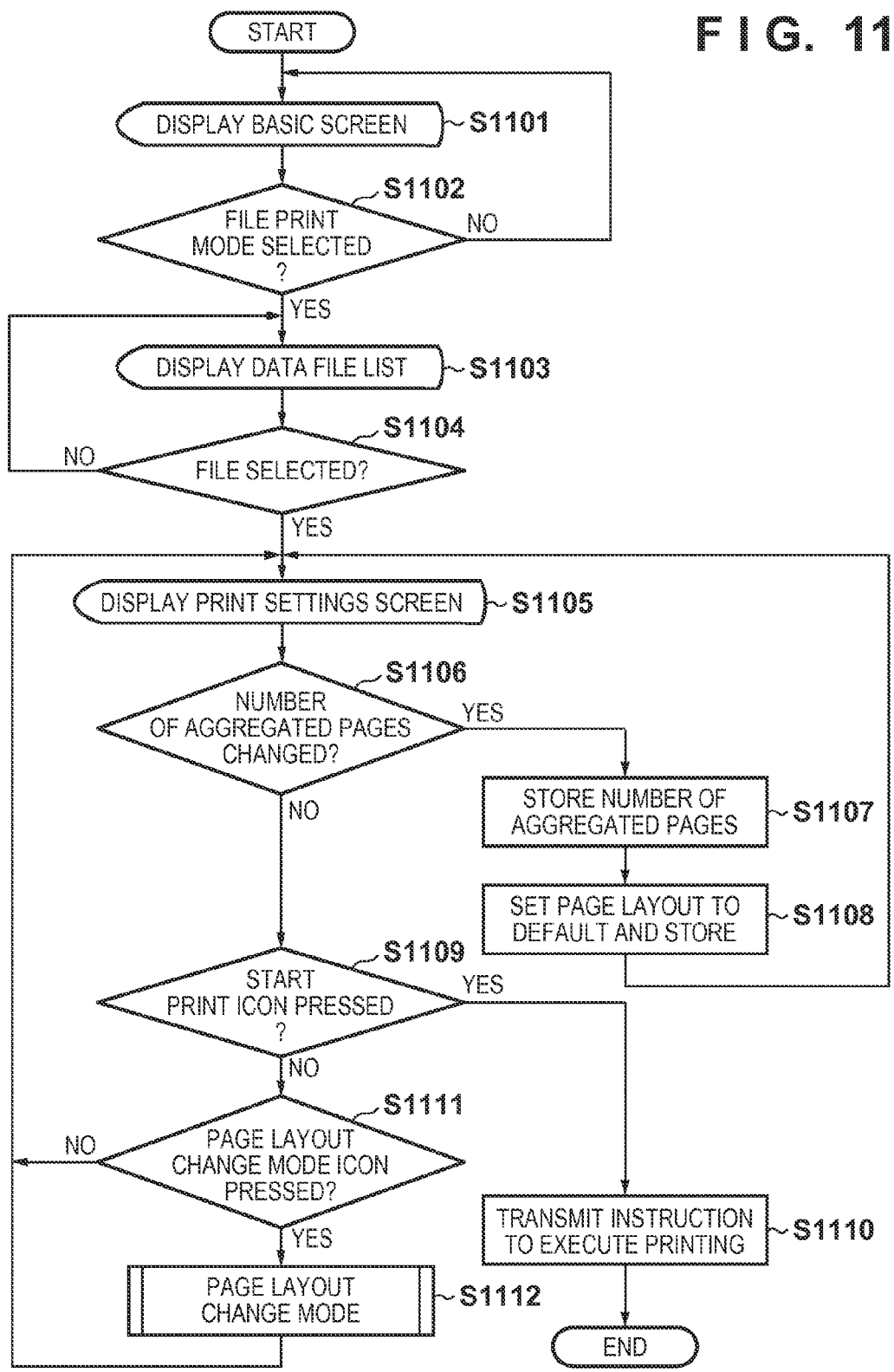
FIG. 11 is a flowchart of printing processing according to the first and second embodiments.
Figure 14:
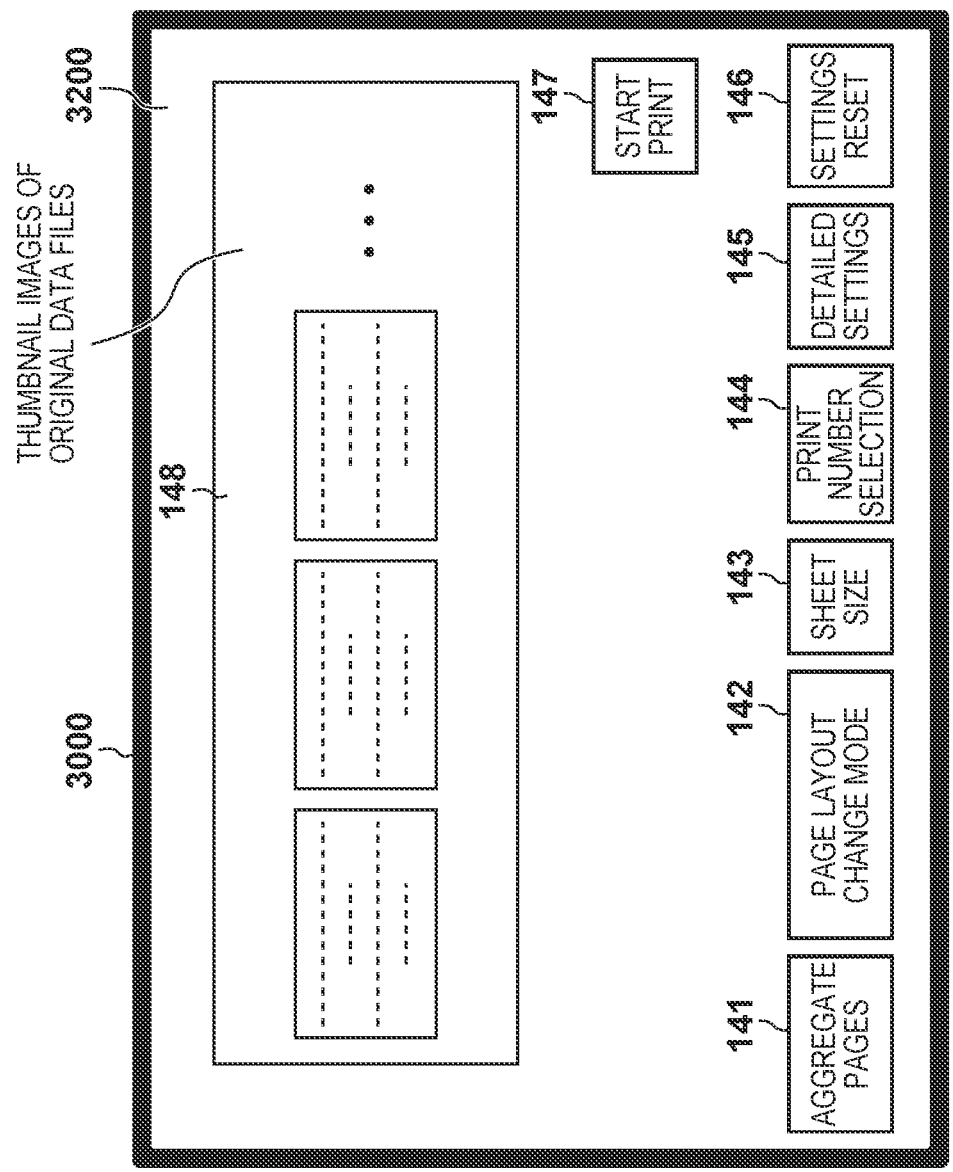
FIG. 14 is a diagram showing an example of a screen of an input display panel when print settings are set according to the first and second embodiments.

Below, a flow of processing of the printing processing in the first embodiment will be described with reference to FIGS. 7, 11, and 14. FIG. 11 shows a flowchart in which the page layout of a data file in the external memory 3112 connected to the input display panel 3000 is changed using the method of changing a page layout according to the present embodiment, and an instruction to execute printing of the data file is transmitted to the printing apparatus 1000. The processing described below is realized due to the CPU 3101 of the input display panel 3000 deploying a control program on the FLASH ROM 3106 to the RAM 3107 and executing it. Note that some portions of the processing realized in the description below correspond to a function of the software module cluster 3113.

In step S1101, the CPU 3101 causes the LCD 3200 to display a basic menu screen of the input display panel 3000. The basic menu screen is provided by a firmware module stored in the FLASH ROM 3106. For example, a user can select whether to perform a copy, a scan, or a file print, due to a menu screen as in FIG. 7 being displayed.

In step S1102, the CPU 3101 determines whether or not file print mode was selected by the user. If file print mode has not been selected, the processing returns to step S1101, and if it has been selected, the processing continues to step S1103. In step S1103, the CPU 3101 displays a list of data files in the external memory 3112. The file list includes document data such as PDFs, and image data such as JPEG files for example. The data files are displayed as a list or as icons, and the user can freely select files using a touch operation.

Next, in step S1104, the CPU 3101 determines whether or not a file was selected by the user. The user can select an original data file, such as a full-color four-page PDF data file for example. Additionally, the user can select multiple files. If a file was selected, the processing continues to step S1105, if no file has been selected, the processing returns to step S1103.

In step S1105, the CPU 3101 displays a print settings screen for the selected data file on the LCD 3200. The user can freely change print settings due to a settings screen, such as the one shown in FIG. 14 for example, being displayed. As shown in FIG. 14, icons (buttons) 141 to 147 are displayed on the LCD 3200, and the user can select an icon via input to the touch panel 3300 by touching the corresponding icon on the LCD 3200. Additionally, a thumbnail image of an original data file is displayed in 148.

Here, the details of 141 to 148 will be described. Reference numeral 141 indicates an icon for changing number of aggregated pages. The user can select two-page aggregation or four-page aggregation for example. Reference numeral 142 indicates an icon for proceeding to page layout change mode. Page layout change mode is a characteristic point of the present invention and will be described later in detail. Reference numeral 143 indicates an icon for changing the print sheet size of the data file, and reference numeral 144 indicates an icon for selecting the number of print sets of the data file. Reference numeral 145 indicates an icon for determining print settings in detail in order to establish optional finisher settings, and image processing settings such as background patterns. Using this icon, the page layout order can be changed with a conventional method rather than using the page layout change mode, which is a feature of the present invention. Reference numeral 146 indicates an icon for resetting settings. Settings initialization such as returning to the default sheet size, resetting the number of print sets to one, and resetting the number of aggregated pages to one can be performed for example.

Reference numeral 147 indicates an icon for starting printing. When the PRINT start icon is pressed, print image data and an instruction to execute printing are transmitted to the printing apparatus 1000. The printing apparatus 1000 receives the instruction to execute printing and the print image data and performs printing of the print image data with the designated sheet size, number of print sets, number of aggregated pages, and page layout. For example, the input display panel 3000 generates print image data that includes the number of aggregated pages and page layout information in a language such as PDL (Page Description Language) and transmits this data to the printing apparatus 1000 along with an instruction to execute printing, such as information about the number of print sets. The printing apparatus 1000 performs the designated printing based on the received print image data and the instruction to execute printing. Alternatively, a PDF or image data such as a JPEG may be transmitted to the printing apparatus 1000 along with an instruction to execute printing including the number of aggregated pages and the page layout, and based on this instruction to execute printing, printing may be performed by generating print image data with the printing apparatus 1000. In this case, the CPU 1101 analyzes the PDL received by the printing apparatus 1000 from the input display panel 3000, and performs printing processing according to a protocol that was set in advance. However, the present embodiment is an example, and the present invention is not limited to this.

Reference numeral 148 indicates a thumbnail image of an original data file. The user can roughly check how the original data file will be printed using 148. Additionally, the user can change the vertical direction of the original and freely select a page to be printed by touching the thumbnail image.

The description will now return to FIG. 11. In step S1106, the CPU 3101 determines whether or not the number of aggregated pages was changed.

Specifically, the user can change the number of aggregated pages by pressing the icon 141. If the number of aggregated pages was changed, the processing continues to step S1108, if it was not changed, the processing continues to step S1110.

In step S1107, the CPU 3101 stores the changed number of aggregated pages in the aggregated page number holding unit 3118. Subsequently, in step S1108, the CPU 3101 sets the page layout order of the page-aggregated original data file to the default, and the processing returns to step S1105. For example, if the number of aggregated pages is changed to 2in1, the left side in the page layout order will be the first page, and the right side will be the second page. However, the default layout order can be changed freely with use of a program, and is not limited to this example.

Meanwhile, in step S1109, the CPU 3101 determines whether or not the print start icon 147 was pressed by the user. If it was pressed, the processing continues to step S1110, which is the instruction to execute printing, and if it was not pressed, the processing continues to step S1111. In step S1110, the CPU 3101 performs transmission of an instruction to execute printing to the printing apparatus 1000, and the processing ends.

Meanwhile, in step S1111, the CPU 3101 determines whether or not the icon 142 for the page layout change mode was pressed. If it was pressed, the processing continues to page layout change mode in step S1113, and if it was not pressed, the processing returns to step S1106. In step S1112, the CPU 3101 proceeds to page layout change mode. Page layout change mode will be described later in detail, with reference to FIGS. 12 and 13.

Flow of Processing in Page Layout Change Mode

Figure 12B:
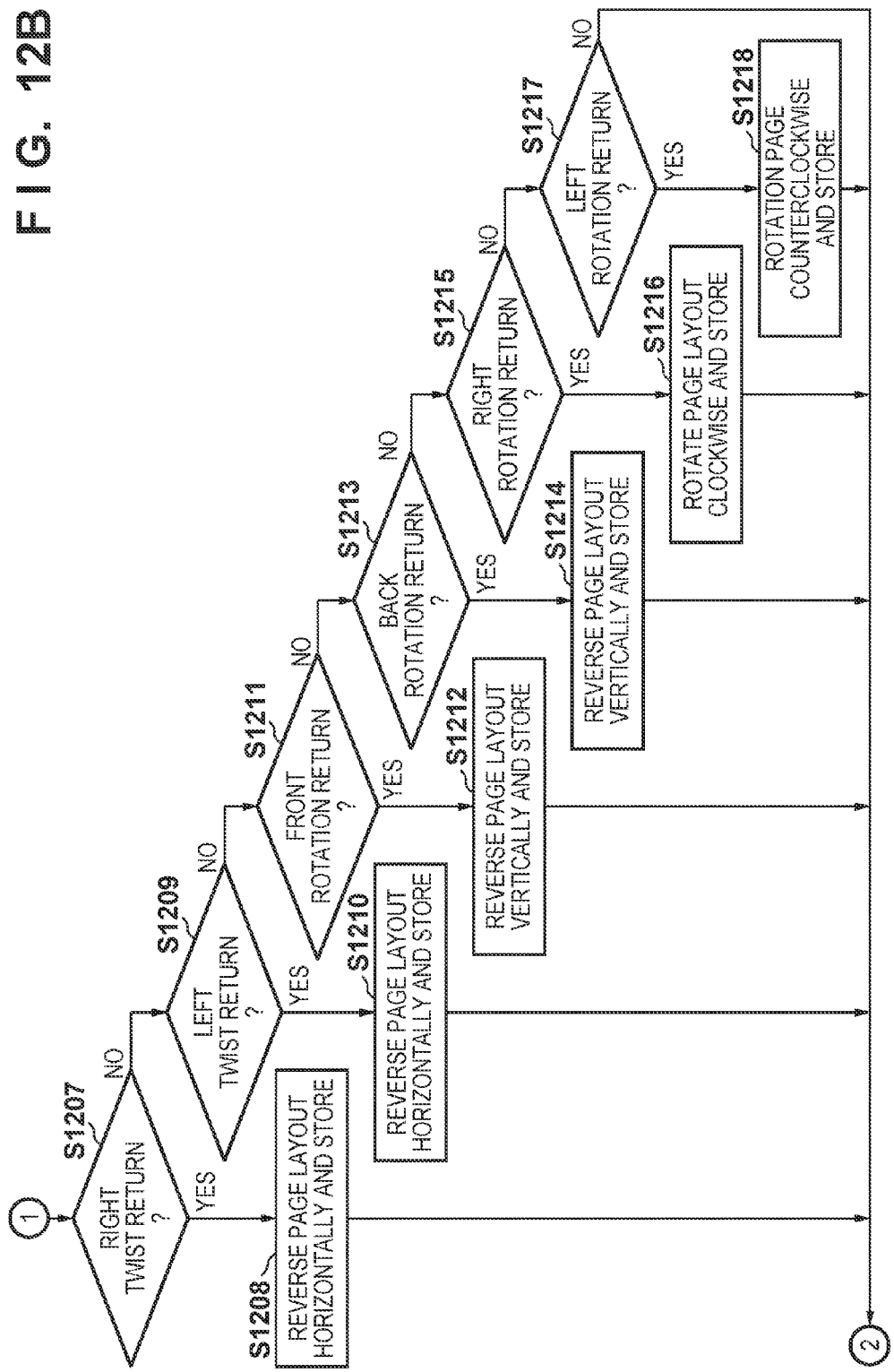
Figure 13:
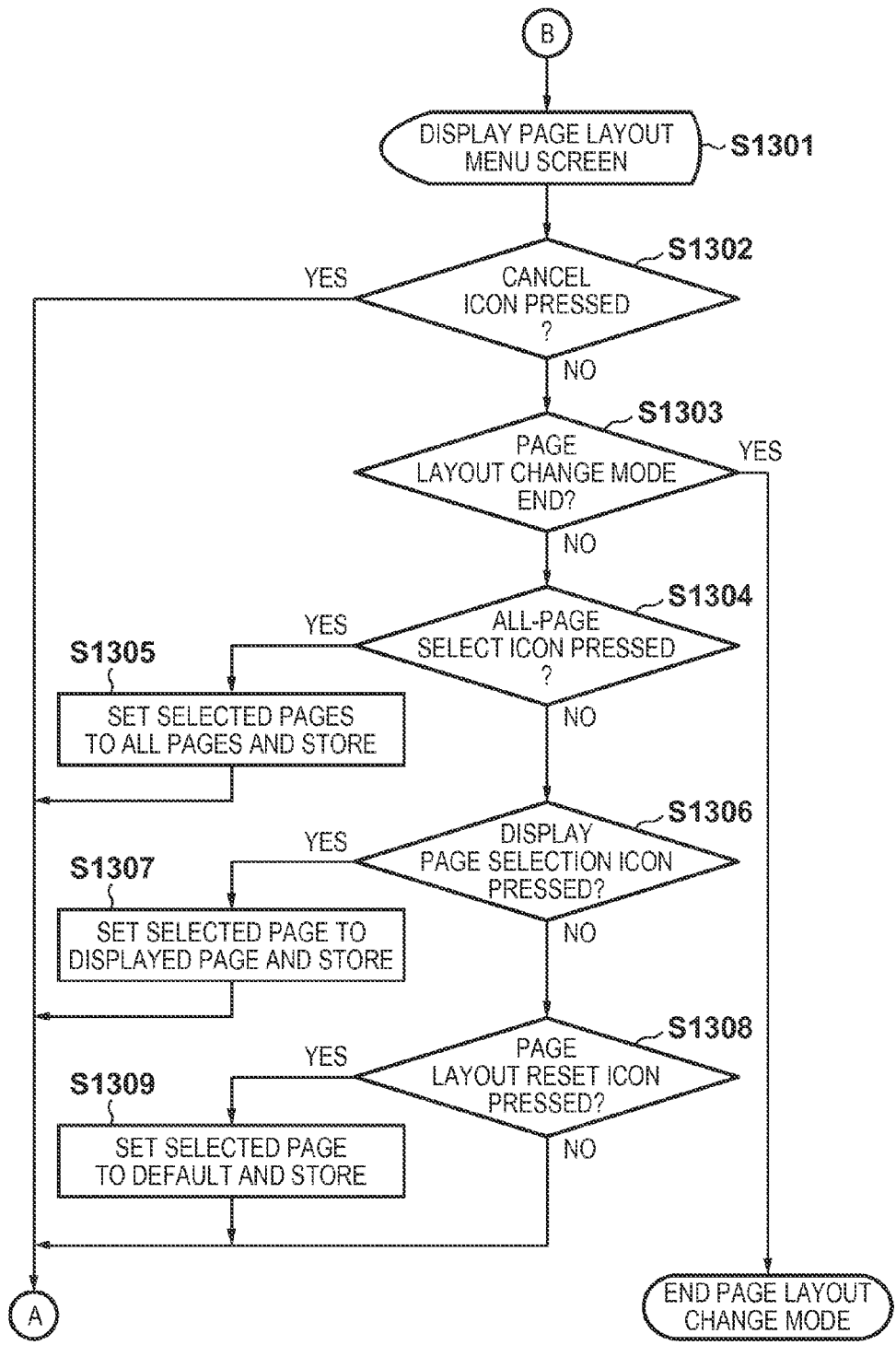
FIG. 13 is a flowchart of processing to change page layout order according to the first embodiment.

Next, the flow of processing in the page layout change mode will be described with reference to FIGS. 10, 12, 13, 15, and 16. FIGS. 12 and 13 show page layout change mode from start to end. The processing described below is realized by the CPU 3101 of the input display panel 3000 deploying a control program on the FLASH ROM 3106 to the RAM 3107 and executing it. Note that some portions of the processing realized in the description below correspond to a function of the software module cluster 3113. First, the flowchart in FIGS. 12A and 12B will be described.

In step S1201, the CPU 3101 stores the panel orientation of the input display panel 3000 in the panel orientation holding unit 3117. Specifically, the panel orientation (portrait orientation or landscape orientation) detected by the panel orientation detection unit 3116 is stored in the panel orientation holding unit 3117. In step S1202, the CPU 3101 displays the main screen of the page layout change mode (full-screen preview display). For example, if the display direction of the original is landscape, the orientation of the input display panel 3000 is the landscape orientation, and the number of aggregated pages is four, it will be displayed similarly to FIG. 15.

In step S1203, the CPU 3101 determines whether or not a long press was performed on the touch panel 3300 by the user. If a long press was performed, the processing continues to FIG. 13-B, and if it was not performed, the processing continues to step S1204. In step S1204, the CPU 3101 determines whether or not a rotation operation, as defined according to FIG. 4, was detected by the input display panel 3000. If a rotation operation was detected, the processing continues to step S1205, and if it was not detected, the processing continues to step S1203.

In step S1205, the CPU 3101 determines whether or not the orientation of the input display panel 3000 (portrait orientation or landscape orientation) was changed. If the orientation of the input display panel 3000 has changed, the processing returns to step S1201, and rotation of the preview display image and adjustment of the display scale are performed (FIG. 10). If the orientation of the input display panel 3000 has not changed, the processing continues to step S1206.

In step S1206, the CPU 3101 determines whether or not the number of aggregated pages is one. If the number of aggregated pages is one, layout change does not occur, and therefore the processing returns to step S1203. If the number of aggregated pages is not one, the processing continues to S1207. If the number of aggregated pages is four for example, page layout change occurs, and therefore the processing continues to step S1207. In step S1207, the CPU 3101 determines whether or not the rotation of the input display panel 3000 was a "right twist return". Specifically, the panel rotation detection unit 3115 determines whether or not the input display panel 3000 underwent a "right twist return". If it was a "right twist return", the processing continues to step S1208, and if it was not, the processing continues to step S1209.

In step S1208, the CPU 3101 causes the page layout order to reverse horizontally and stores the page layout order in the page layout holding unit 3119, and the processing returns to step S1202. When the page layout order is reversed horizontally and stored in the page layout holding unit 3119, in step S1202, the left and right pages are reversed and displayed as a full-screen preview as in FIG. 9-*a*. In step S1209, the CPU 3101 determines whether or not the rotation of the input display panel 3000 was a "left twist return". Specifically, the panel rotation detection unit 3115 determines whether or not the input display panel 3000 underwent a "left twist return". If it was a "left twist return", the processing continues to step S1210, and if it was not, the processing continues to step S1211.

In step S1210, the CPU 3101 causes the page layout order to reverse horizontally and stores the page layout order in the page layout holding unit 3119, and the processing returns to step S1202. When the page layout order is reversed horizontally and stored in the page layout holding unit 3119, in step S1202, the left and right pages are reversed and displayed as a full-screen preview as in FIG. 9-b. In step S1211, the CPU 3101 determines whether or not the rotation of the input display panel 3000 was a "front rotation return". Specifically, the panel rotation detection unit 3115 determines whether or not the input display panel 3000 underwent a "front rotation return". If it was a "front rotation return", the processing continues to step S1212, and if it was not, the processing continues to step S1213.

In step S1212, the CPU 3101 causes the page layout order to reverse vertically and stores the page layout order in the page layout holding unit 3119, and the processing returns to step S1202. When the page layout order is reversed vertically and stored in the page layout holding unit 3119, in step S1202, the top and bottom pages are reversed and displayed as a full-screen preview as in FIG. 9-c. In step S1213, the CPU 3101 determines whether or not the rotation of the input display panel 3000 was a "back rotation return". Specifically, the panel rotation detection unit 3115 determines whether or not the input display panel 3000 underwent a "back rotation return". If it was a "back rotation return", the processing continues to step S1214, and if it was not, the processing continues to step S1215.

In step S1214, the CPU 3101 causes the page layout order to reverse vertically and stores the page layout order in the page layout holding unit 3119, and the processing returns to step S1202. When the page layout order is reversed vertically and stored, in step S1202, the top and bottom pages are reversed and displayed as a full-screen preview as in FIG. 9-d. In step S1215, the CPU 3101 determines whether or not the rotation of the input display panel 3000 was a "right rotation return". Specifically, the panel rotation detection unit 3115 determines whether or not the input display panel 3000 underwent a "right rotation return". If it was a "right rotation return", the processing continues to step S1216, and if it was not, the processing continues to step S1217.

In step S1216, the CPU 3101 causes the page layout order to shift one space clockwise and stores the page layout order in the page layout holding unit 3119, and the processing returns to step S1202. When the page layout order is shifted one space clockwise and stored in the page layout holding unit 3119, in step S1202, the layout of all the pages is shifted one space clockwise and displayed as a full-screen preview as in FIG. 9-e. In step S1217, the CPU 3101 determines whether or not the rotation of the input display panel 3000 was a "left rotation return". Specifically, the panel rotation detection unit 3115 determines whether or not the input display panel 3000 underwent a "left rotation return". If it was a "left rotation return", the processing continues to step S1218, and if it was not, the processing continues to step S1202. In step S1218, the CPU 3101 causes the page layout order to shift one space counterclockwise and stores the page layout order in the page layout holding unit 3119, and the processing returns to step S1202. When the page layout order is shifted one space counterclockwise and stored in the page layout holding unit 3119, in step S1202, the layout of all the pages is shifted one space counterclockwise and displayed as a full-screen preview as in FIG. 9-f.

Next, the flowchart in FIG. 13 will be described. In step S1301, the CPU 3101 displays the menu screen of the page layout change mode. For example, the menu screen is displayed as in FIG. 16. Icons 161 to 165 will be described in steps S1302 to S1308 in the flowchart.

In step S1302, the CPU 3101 determines whether or not a cancel icon 161 was pressed. If the cancel icon was pressed, the processing continues to FIG. 12A-A, and the main screen is displayed (full-screen preview display) again in step S1202. If it was not pressed, the processing continues to S1303.

In step S1303, the CPU 3101 determines whether or not an icon 165 for ending the page layout change mode was pressed. If the end icon was pressed, page layout change mode ends, and the print settings screen is displayed (step S1106 in FIG. 11). If it was not pressed, the processing continues to step S1304. In step S1304, the CPU 3101 determines whether or not an icon 164 for selecting all pages was pressed. If the select all pages icon was pressed, the processing continues to step S1305. If it was not pressed, the processing continues to step S1306.

In step S1305, the CPU 3101 sets the selected page setting to all pages and stores it in the selected page holding unit 3120, and the processing continues to FIG. 12A-A. When the selected page setting is set to all pages and stored in the selected page holding unit 3120, the subsequent change of the page layout order is reflected on all pages. The screen display then returns from the menu selection screen in FIG. 16 to the main screen in FIG. 15. In step S1306, the CPU 3101 determines whether or not an icon 163 for selecting a page to display was pressed. If the icon for selecting a page to display was pressed, the processing continues to step S1307, and if it was not pressed, the processing continues to step S1308.

In step S1307, the CPU 3101 sets the selected page setting to the currently displayed page and stores it in the selected page holding unit 3120, and the processing continues to FIG. 12A-A. When the selected page setting is set to the displayed page and stored in the selected page holding unit 3120, the changed settings of the page layout order are reflected only on the page currently being displayed as a preview. The screen display then returns from the menu selection screen in FIG. 16 to the main screen in FIG. 15.

In step S1308, the CPU 3101 determines whether or not an icon 162 for resetting the page layout was pressed. If the page layout reset icon was pressed, the processing continues to step S1309, and if it was not pressed, the processing continues to FIG. 12A-A. In step S1309, the CPU 3101 sets the page layout order to the default and stores it in the page layout holding unit 3119, and the processing continues to FIG. 12A-A. For example, if the page layout order is the screen after being changed in FIG. 9-a, it is returned to the default screen.

As described above, in the present embodiment, a user can intuitively change a page layout order when instructing printing from an input display device that includes a three-dimensional gyro sensor to a printing apparatus, by performing rotation operations according to predetermined maneuvers on the input display panel. Additionally, this results in an improvement in the operability of changing the page layout order. According to this, an operation to change the page layout order with the user's intended layout can be performed, and printing mistakes can be reduced.

Second Embodiment

A second embodiment for implementing the present invention will be described below with reference to FIGS. 17 through 19. In the above-mentioned first embodiment, an example was described in which processing to change the layout order was performed by a rotation operation performed on the input display panel 3000. In the present embodiment, an example will be described in which designated pages are locked when performing processing to change the page layout order. In particular, in the present embodiment, page lock processing is added to the above-mentioned first embodiment, and therefore, the present embodiment will be described with a focus on that point. Descriptions of configurations and techniques similar to those in the first embodiment will be omitted below.

System Configuration

First, an example of a configuration of a printing system of the present embodiment will be described with reference to FIG. 17. The printing apparatus 1000, the dock 2000, and the input display panel 3000 can be realized with a configuration that is the same as in the first embodiment. One difference from the first embodiment is that a locked page holding unit 3122 has been added to the software module cluster 3113.

Page Layout Change Processing

Next, with reference to FIG. 18, an example will be described in which the page layout order is changed by page layout change processing, with the first page in a locked state in a four-page aggregated original displayed as a full-screen preview on the input display panel 3000. A difference from the first embodiment is that the first page is locked due to the user touching (pressing) the first page. According to this, during subsequent page layout change processing, the page layout of the first page and a page that would have been the change target of the first page are not changed. The present embodiment is the same as the first embodiment, other than the fact that the first page is locked. Additionally, the locked page does not need to be the first page. The second, third, or fourth page in FIG. 18 may be locked for example. Additionally, multiple pages may be locked by touching multiple pages.

For example, FIG. 18-a shows a state in which horizontal page reversal is performed as page layout change processing by a right twist return. When the above-mentioned operation is performed in the first embodiment, the layouts of pages 1 and 3 are changed in order with those of pages 2 and 4 respectively. However, in the present embodiment, before the above-mentioned operation is performed, the first page is put in a locked state by pressing the display region of the first page. Accordingly, only the change in the layout of the third page and the fourth page is performed, while the change in the layout of the first page and second page is not.

Flow of Processing in Page Layout Change Mode

Figure 19A:
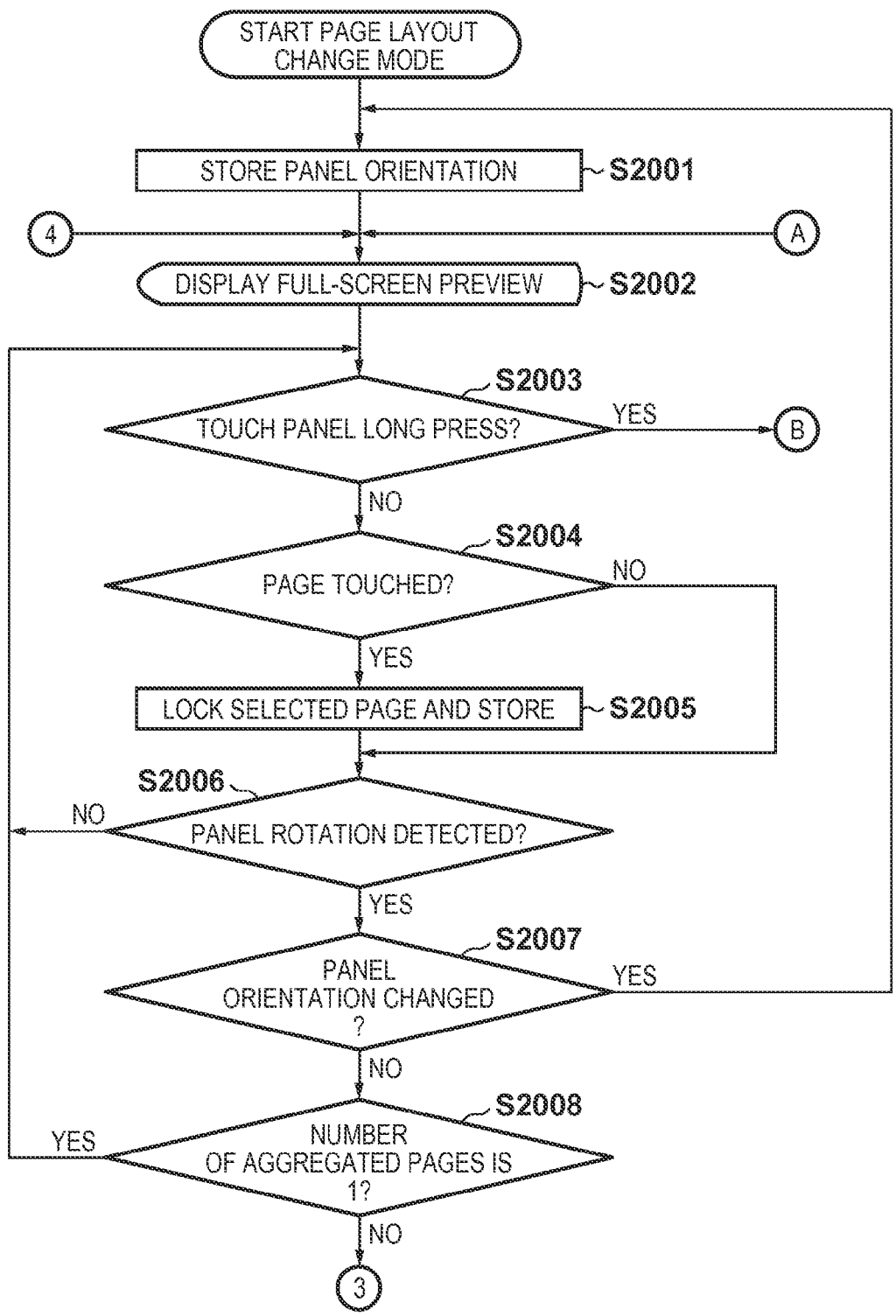
FIGS. 19A and 19B are flowcharts of processing to change page layout order according to the second embodiment.
Figure 19B:
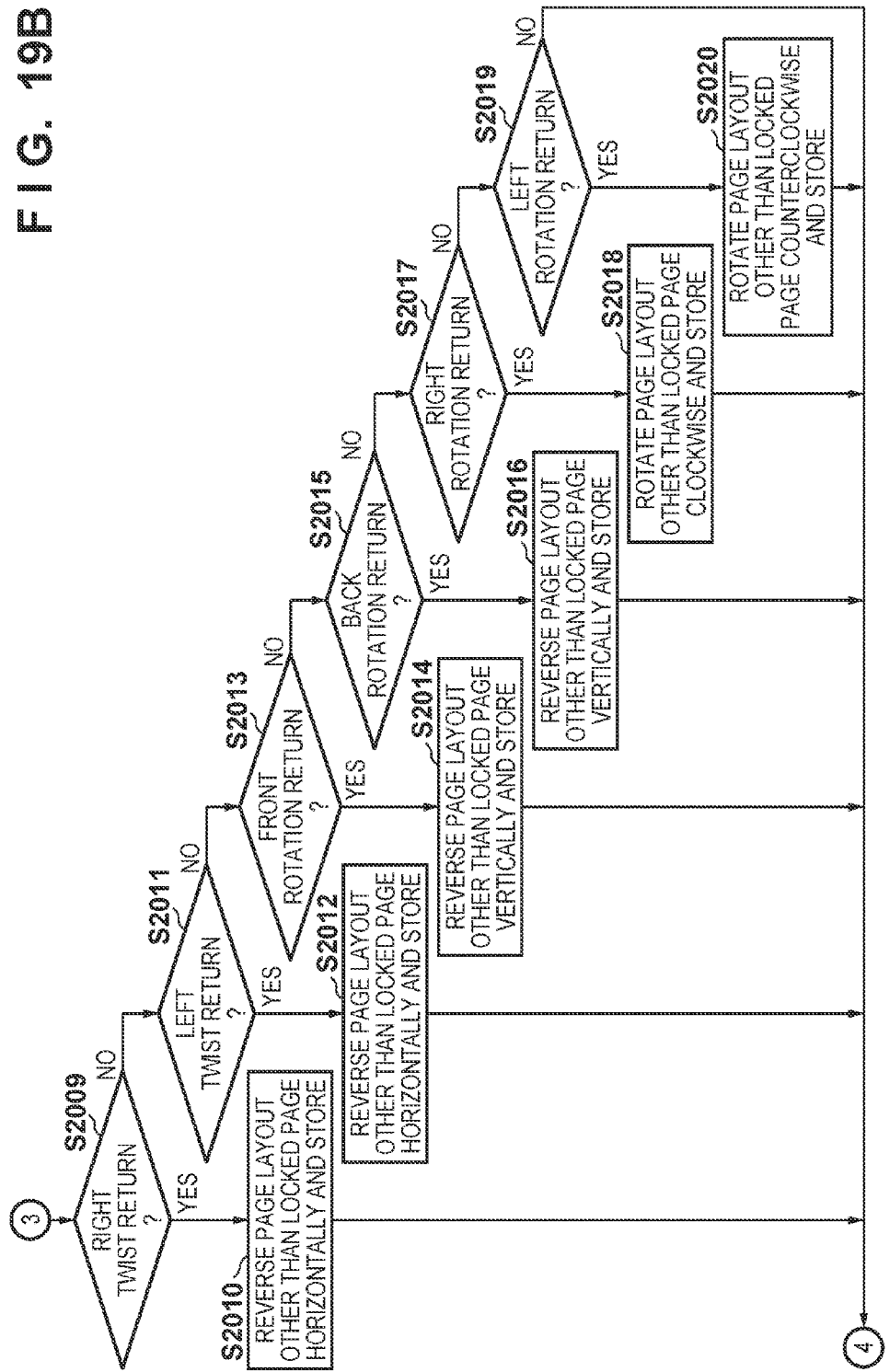

Next, the flow of processing in the page layout change mode of the second embodiment will be described with reference to FIGS. 19A and 19B. The processing described below is realized by the CPU 3101 of the input display panel 3000 deploying a control program on the FLASH ROM 3106 to the RAM 3107 and executing it. Note that some portions of the processing realized in the description below correspond to a function of the software module cluster 3113. Note that the differences from the above-mentioned first embodiment (FIGS. 12A and 12B) are mainly described below.

In step S2004, the CPU 3101 functions as a press detection unit, and determines whether or not a predetermined page was touched by the user. For example, it detects whether or not the display region of the first page as in FIG. 18 was touched by the user. If a page was touched, the processing continues to step S2005, and if it was not touched, the processing continues to step S2006. In step S2005, the CPU 3101 functions as a control unit, sets the touched page as a lock setting, and stores it in the locked page holding unit 3122, and the processing continues to step S2006. Here, the lock setting indicates that the corresponding page will be excluded as a target of a change in page layout order during subsequent user operations (return operations). As described above, the page layout of a locked page is not changed, even when processing to change page layout order is performed. In steps S2010, S2012, S2014, S2016, S2018, and S2020, the layout of pages excluding the locked page is changed and stored in the page layout holding unit 3119, and the processing returns to step S2002.

In the present embodiment, an example was described in which page layout change processing was not performed on a designated page due to the designated page being locked by a touch operation, but page layout change processing was performed on the other unlocked pages. According to this, the operation can more intuitively set an intended change of page layout order. Additionally, in the present embodiment, an example of page aggregation from one page to four pages was described as an example of a change in page layout order when pages are aggregated. However, the present invention is not limited to this, and can be implemented in cases where four or more pages are displayed as a preview in so-called N-page aggregation. The present invention was described by way of the various examples and embodiments of the present invention, but it would be appreciated by a person skilled in the art that the gist and scope of the present invention is not limited to specific descriptions in the present specification. Note that all configurations obtained by combining the above-mentioned embodiments and the variations thereof are included in the present invention.

As described above, according to the present invention, page layout order in page aggregation can, in response to a rotation operation performed on the input display panel 3000, be changed with use of the input display panel 3000 that includes the three-dimensional acceleration sensor 3108 and the three-dimensional gyro sensor 3109 and that can communicate wirelessly with the printing apparatus 1000. Additionally, printing can be performed by the printing apparatus 1000 in a layout that is displayed as a preview on the input display panel 3000. This improves operability to the user.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-133275 filed on Jun. 12, 2012, which is hereby incorporated by reference herein in its entirety.

What is claimed is:

1. An input display device comprising:
a holding unit configured to hold print target data;
a display unit configured to aggregate pages of the print target data held by the holding unit and display a plurality of pages at one time as a preview;
a rotation detection unit configured to detect a rotation operation performed on the input display device by a user; and a change unit configured to, when the plurality of pages are aggregated and displayed by the display unit, if a predetermined rotation operation has been detected by the rotation detection unit, change a layout order of the plurality of pages displayed by the display unit, wherein the predetermined rotation operation is a return operation in which the input display device is rotated by the user in a predetermined direction from an original base state indicating a state before being operated by the user, and subsequently returned to the original base state.

2. The input display device according to claim 1, further comprising:

an orientation detection unit configured to detect whether an orientation of the input display device is a portrait orientation or a landscape orientation, wherein the change unit changes the layout order of the plurality of pages that are displayed by the display unit according to a combination of the orientation of the input display device detected by the orientation detection unit and the predetermined rotation operation.

3. The input display device according to claim 1, wherein the rotation detection unit detects that the input display device was rotated in the predetermined direction if the input display device has been rotated by an angle in a predetermined range from the original base state.

4. The input display device according to claim 1, wherein if the input display device has been rotated by the user in the predetermined direction and subsequently returned to the original base state in a certain amount of time, the rotation detection unit detects that the return operation was performed.

5. The input display device according to claim 1, further comprising:

a press detection unit configured to detect a press by the user on the preview that includes the plurality of pages displayed by the display unit; and a control unit configured to, if the press by the user has been detected by the press detection unit, exclude a page displayed in a pressed position from a target of the layout order change in a subsequent user operation.

6. The input display device according to claim 1, further comprising:

a designation unit configured to transmit to a printing apparatus a printing instruction in accordance with the layout order of the plurality of pages of the print target data that is held in the holding unit.

7. The input display device according claim 2, wherein the orientation detection unit detects the orientation using an acceleration sensor, and the rotation detection unit detects the rotation operation using a gyro sensor.

8. A method of controlling an input display device, comprising:

aggregating pages of print target data and displaying a plurality of pages at one time as a preview;

detecting a rotation operation performed on the input display device by a user; and changing, when the plurality of pages are aggregated and displayed in the displaying step, if a predetermined rotation operation has been detected in the detecting step, a layout order of the plurality of pages displayed in the displaying step, wherein the predetermined rotation operation is a return operation in which the input display device is rotated by the user in a predetermined direction from an original base state indicating a state before being operated by the user, and subsequently returned to the original base state.

9. A non-transitory computer-readable storage medium storing a computer program for causing a computer to execute steps in the method of controlling the input display device according to claim 8.

10. A printing apparatus comprising:

an input display device; and a printing unit configured to execute printing according to data received from the input display device, wherein the input display device comprises:

a holding unit configured to hold print target data;

a display unit configured to aggregate pages of the print target data held by the holding unit and display a plurality of pages at one time as a preview;

a rotation detection unit configured to detect a rotation operation performed on the input display device by a user; and a change unit configured to, when the plurality of pages are aggregated and displayed by the display unit, if a predetermined rotation operation has been detected by the rotation detection unit, change a layout order of the plurality of pages displayed by the display unit, wherein the predetermined rotation operation is a return operation in which the input display device is rotated by the user in a predetermined direction from an original base state indicating a state before being operated by the user, and subsequently returned to the original base state.

* * * * *